US012273980B2

United States Patent
(12) United States Patent
Narayanan et al.

(10) Patent No.: US 12,273,980 B2
(45) Date of Patent: Apr. 8, 2025

(54) NETWORKING DEVICE CONNECTABLE LED SYSTEM

(71) Applicant: Dell Products L.P., Round Rock, TX (US)

(72) Inventors: Padmanabhan Narayanan, Chennai (IN); Vamshidhar Varre, Hyderabad (IN)

(73) Assignee: Dell Products L.P., Round Rock, TX (US)

(*) Notice: Subject to any disclaimer, the term of this patent is extended or adjusted under 35 U.S.C. 154(b) by 169 days.

(21) Appl. No.: 18/196,059

(22) Filed: May 11, 2023

(65) Prior Publication Data

US 2024/0381513 A1 Nov. 14, 2024

(51) Int. Cl.
*H05B 47/10* (2020.01)
*H05B 47/155* (2020.01)
*H05B 47/18* (2020.01)

(52) U.S. Cl.
CPC ........... *H05B 47/18* (2020.01); *H05B 47/155* (2020.01)

(58) Field of Classification Search
CPC ........ H05B 45/10; H05B 45/30; H05B 47/10; H05B 47/18; H05B 47/155
See application file for complete search history.

(56) References Cited

U.S. PATENT DOCUMENTS

2004/0160199 A1* 8/2004 Morgan .................. G09G 3/32 315/312

* cited by examiner

*Primary Examiner* — Jimmy T Vu
(74) *Attorney, Agent, or Firm* — Joseph Mencher

(57) ABSTRACT

A networking device connectable LED system includes a connectable LED system chassis, a networking device connector on the connectable LED system chassis, LEDs on the connectable LED system chassis, and an LED control subsystem in the connectable LED system chassis that is coupled to the networking device connector and the LEDs. The LED control subsystem receives, via the networking device connector when it is connected to a networking device via a first port of a plurality of ports that are included on the networking device, second port LED control information that is associated with the operation of a second port that is included in the plurality of ports. The LED control subsystem then identifies a second port LED that is included in the LEDs and that is mapped to the second port, and causes the second port LED to illuminate based on the second port LED control information.

20 Claims, 17 Drawing Sheets

NETWORKING DEVICE CONNECTABLE LED SYSTEM

BACKGROUND

The present disclosure relates generally to information handling systems, and more particularly to a connectable Light Emitting Device (LED) system for connecting LEDs to a networking information handling system for use in displaying information associated with ports and other subsystems included in that networking information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, router devices, and/or other networking devices known in the art, often include Light Emitting Device (LED) systems for use in displaying information associated with ports and/or other subsystems included on the networking device. For example, switch devices often include a front panel or other outer surface having "system" LEDs (e.g., a power supply LED, a "master" LED, a fan LED, a "system" LED, a stack identifier LEDs, and/or other system LEDs known in the art) that are configured to display "system" information about the switch device using Field Programmable Gate Array (FPGA) registers, Complex Programmable Logic Device (CPLD) registers, and/or other processing subsystems in the switch device. Furthermore, the front panel or other outer surface on switch devices will also include "switchport" LEDs that are configured to display "port" information (e.g., port link "up"/"down" information, port speed information, port activity information, etc.) about the ports on the switch device that may be received from, for example, a Network Processing Unit (NPU) Media Access Controller (MAC)/Application-Specific Integrated Circuit (ASIC) via a CPLD that decodes and latches that port information for use in driving the switchport LEDs. The use of such conventional LED systems on networking devices raises a number of issues.

For example, the amount of time and effort dedicated to designing the LED system in the networking device (e.g., from both a hardware/CPLD perspective as well as a software/microcontroller code development and testing perspective) can be relatively significant, while the LEDs included on the networking devices discussed above are typically utilized during initial cabling of the networking device and following any subsequent port outage and/or cable maintenance, which when compared to the "up" time of the networking device is relatively insignificant. Furthermore, the LED configuration on the front panel or other outer surface of the networking device is finalized during initial product design such that it cannot be changed, thus constraining modifications to networking device design following that initial product design. Further still, as networking devices are enabled with higher and higher speeds (e.g., currently available 400G port speeds, upcoming 800G port speeds, etc.), their ports will be capable of increasing "breakout" port densities (e.g., with a single 400G port capable of supporting 8 breakout connections, future 800G ports capable of supporting 16 breakout connections, etc.), but conventional LED systems only support 4 LEDs per port and thus are limited to displaying information associated with 4 breakout connections. Finally, LED systems compete for the available space on the front panel of (and within) the networking device, and thus can prevent heat dissipation features and/or other networking device features from being provided on the networking device, which can provide a constraint on the amount of power that may be consumed by the networking device in situations in which heat dissipation is limited.

Accordingly, it would be desirable to provide an LED system that addresses the issues discussed above.

SUMMARY

According to one embodiment, an Information Handling System (IHS) includes a networking device chassis; a plurality of ports included on the networking device chassis; a networking processing system that is included in the networking chassis and that is coupled to the plurality of ports; a networking memory system that is coupled to the networking processing system and that includes instructions that, when executed by the networking processing system, cause the networking processing system to provide a networking engine; a connectable Light Emitting Device (LED) system that includes a networking device connector that is connected to a first port included in the plurality of port; a plurality of LEDs that are included on the connectable LED system; and an LED control subsystem that is included in the connectable LED system, that is coupled to the networking device connector and the plurality of LEDs, and that is configured to: receive, from the networking engine via the networking device connector, second port LED control information that is associated with the operation of a second port that is included in the plurality of ports; identify a second port LED that is included in the plurality of LEDs and that is mapped to the second port; and cause the second port LED to illuminate based on the second port LED control information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
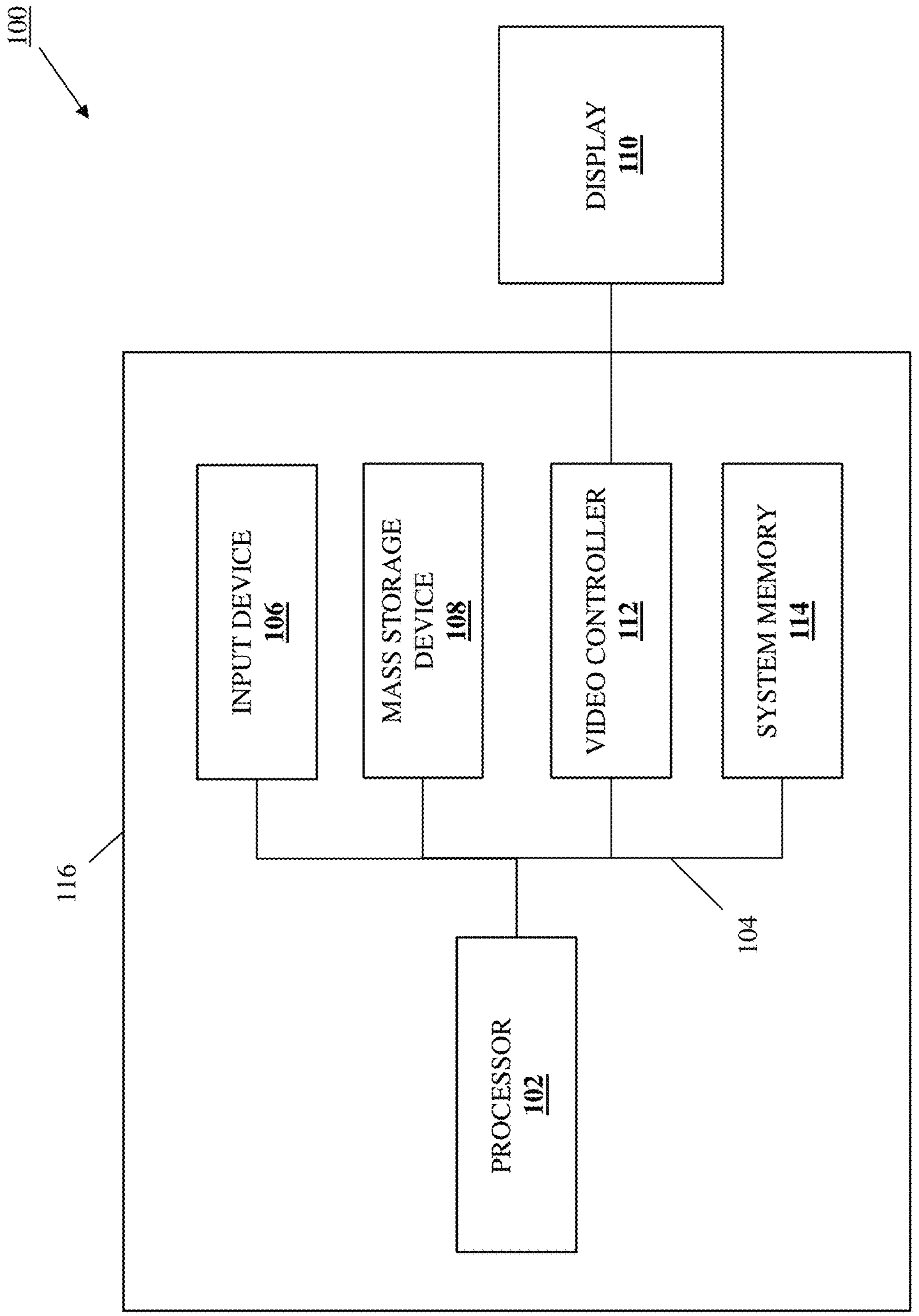
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
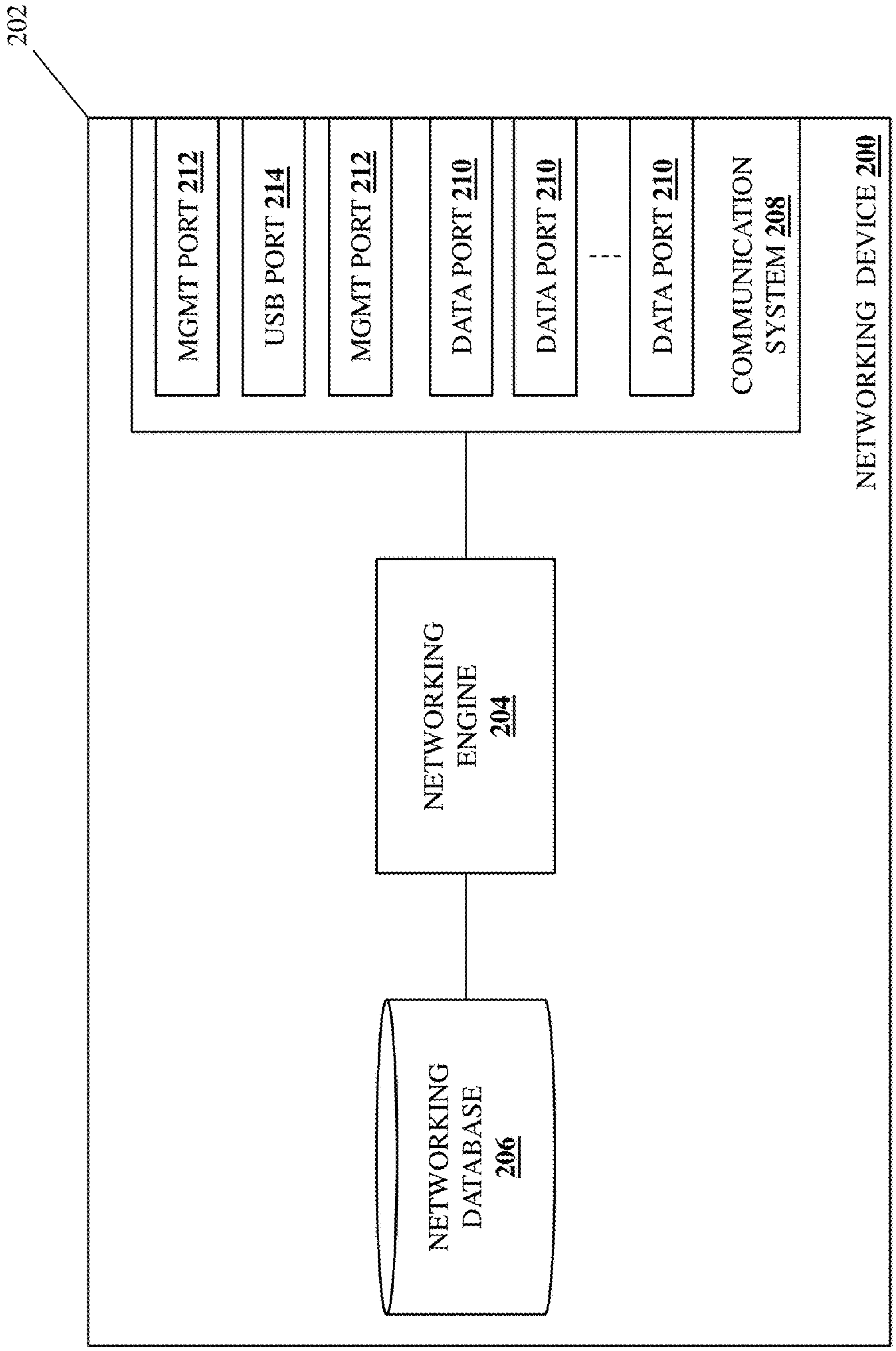
FIG. 2A is a schematic view illustrating an embodiment of a networking device that may utilize the networking device connectable LED system of the present disclosure.
Figure 2B:
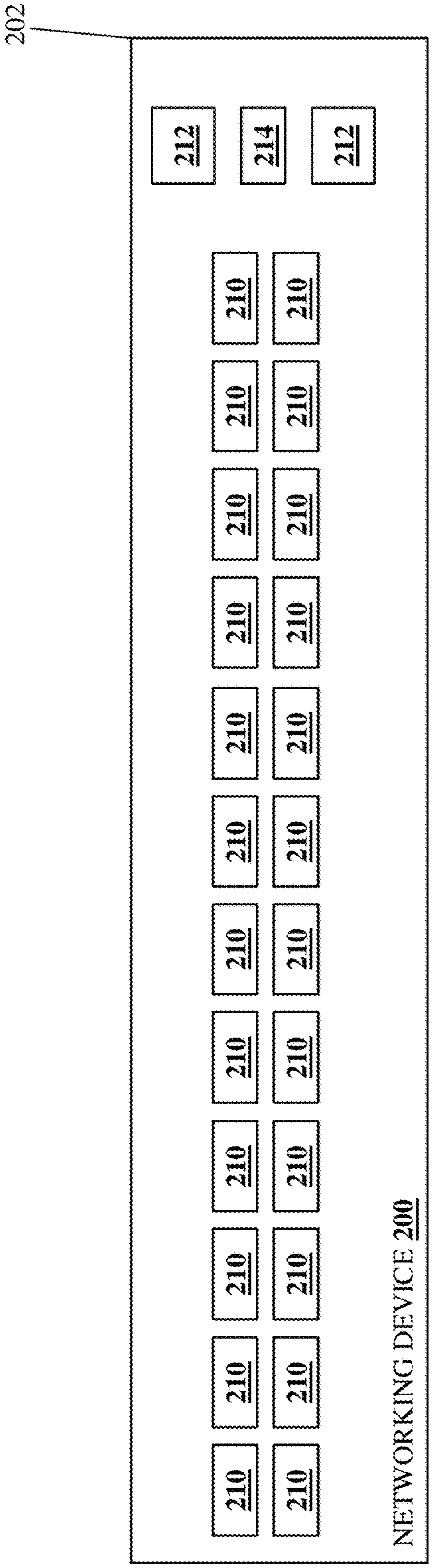
FIG. 2B is a front view illustrating an embodiment of the networking device of FIG. 2A.

Referring now to FIGS. 2A and 2B, an embodiment of a networking device 200 is illustrated that may utilize the networking device connectable LED system of the present disclosure. In an embodiment, the networking device 200 may be provided by the IHS 100 discussed above with reference to FIG. 1 and/or may include some or all of the components of the IHS 100, and in specific examples may be provided by a switch device. However, while illustrated and discussed as a switch device, one of skill in the art in possession of the present disclosure will recognize that the functionality of the networking device 200 discussed below may be provided by other devices that are configured to operate similarly as the networking device 200 discussed below. In the illustrated embodiment, the networking device 200 includes a chassis 202 that houses the components of the networking device 200, only some of which are illustrated and discussed below.

For example, the chassis 202 may house a networking processing system (not illustrated, but which may include a Network Processing Unit (NPU) Media Access Controller (MAC)/Application-Specific Integrated Circuit (ASIC) and/or other networking processing systems that may be similar to the processor 102 discussed above with reference to FIG. 1) and a networking memory system (not illustrated, but which may be similar to the memory 114 discussed above with reference to FIG. 1) that is coupled to the networking processing system and that includes instructions that, when executed by the networking processing system, cause the networking processing system to provide a networking engine 204 that is configured to provide a networking operating system and/or other networking engine that is configured to perform the functionality of the networking engines and/or networking devices discussed below.

The chassis 202 may also house a storage system (not illustrated, but which may include the storage 108 discussed above with reference to FIG. 1) that is coupled to the networking engine 204 (e.g., via a coupling between the storage system and the processing system) and that includes a networking database 206 that is configured to store any of the information utilized by the networking engine 204 discussed below. The chassis 202 may also house a communication system 208 that is coupled to the networking engine 204 (e.g., via a coupling between the communication system 208 and the processing system) and that may include the plurality of ports discussed below, as well as any of a variety of networking device communication components that would be apparent to one of skill in the art in possession of the present disclosure.

In the specific example illustrated in FIGS. 2A and 2B, the plurality of ports on the communication system 208 include plurality of data ports 210 that may be provided by Ethernet "switchports" on a switch device that are configured for use in forwarding data between computing devices in a network provided (at least in part) by the networking device 200 based on routing rules and/or other data transmission information that would be apparent to one of skill in the art in possession of the present disclosure. However, while described as being provided using Ethernet port technology, one of skill in the art in possession of the present disclosure will appreciate how the data ports 210 may be provided using other port technologies that will fall within the scope of the present disclosure as well.

The plurality of ports on communication system 208 in the illustrated embodiment also includes a pair of management ports 212 that are configured for use in management communications between a management device and the networking device 200, and that may be provided by console Ethernet ports, Out-Of-Band (OOB) Ethernet ports, and/or other management ports that would be apparent to one of skill in the art in possession of the present disclosure. However, while described as being provided using Ethernet port technology, one of skill in the art in possession of the present disclosure will appreciate how the management ports 212 may be provided using other port technologies that will fall within the scope of the present disclosure as well.

The plurality of ports on communication system 208 in the illustrated embodiment also includes a Universal Serial Bus (USB) port 214 that that is described below as being utilized by with the networking device connectable LED system of the present disclosure, and that may be provided by Type-A USB ports, Type-B USB ports, or Type-C USB ports, as well as future USB port types while remaining within the scope of the present disclosure as well. However, while described as being provided using USB port technology, one of skill in the art in possession of the present disclosure will appreciate how the USB port 214 may be replaced with a port using other port technologies that will fall within the scope of the present disclosure as well.

As can be seen in the examples illustrated in FIG. 2B, the networking device 200 may include the data ports 210 in two rows along a width of the networking device chassis 202, with the management ports 212 and the USB port 214 positioned between a final column of the data ports 210 and a side of the networking device 200, and with the USB port 214 located between the management ports 212. However, one of skill in the art in possession of the present disclosure will appreciate how a variety of other ports configurations may be provided on the networking device 200 while remaining within the scope of the present disclosure as well. Furthermore, while a specific networking device 200 has been illustrated and described, one of skill in the art in possession of the present disclosure will recognize that networking devices (or other devices operating according to the teachings of the present disclosure in a manner similar to that described below for the networking device 200) may include a variety of components and/or component configurations for providing conventional networking device functionality, as well as the networking device connectable LED functionality discussed below, while remaining within the scope of the present disclosure as well.

Figure 3A:
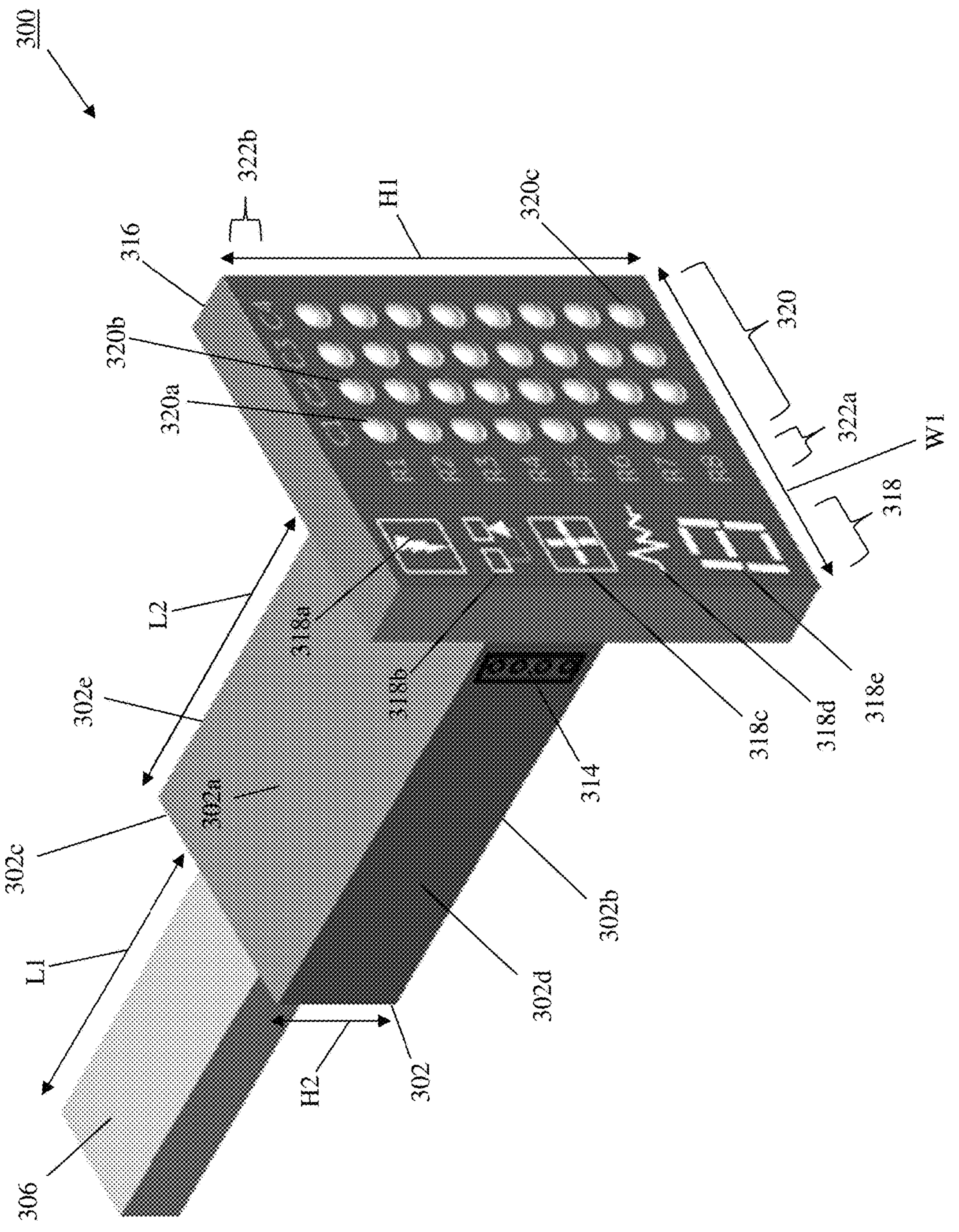
FIG. 3A is a perspective view illustrating an embodiment of a connectable LED system that may be provided according to the teachings of the present disclosure.
Figure 3B:
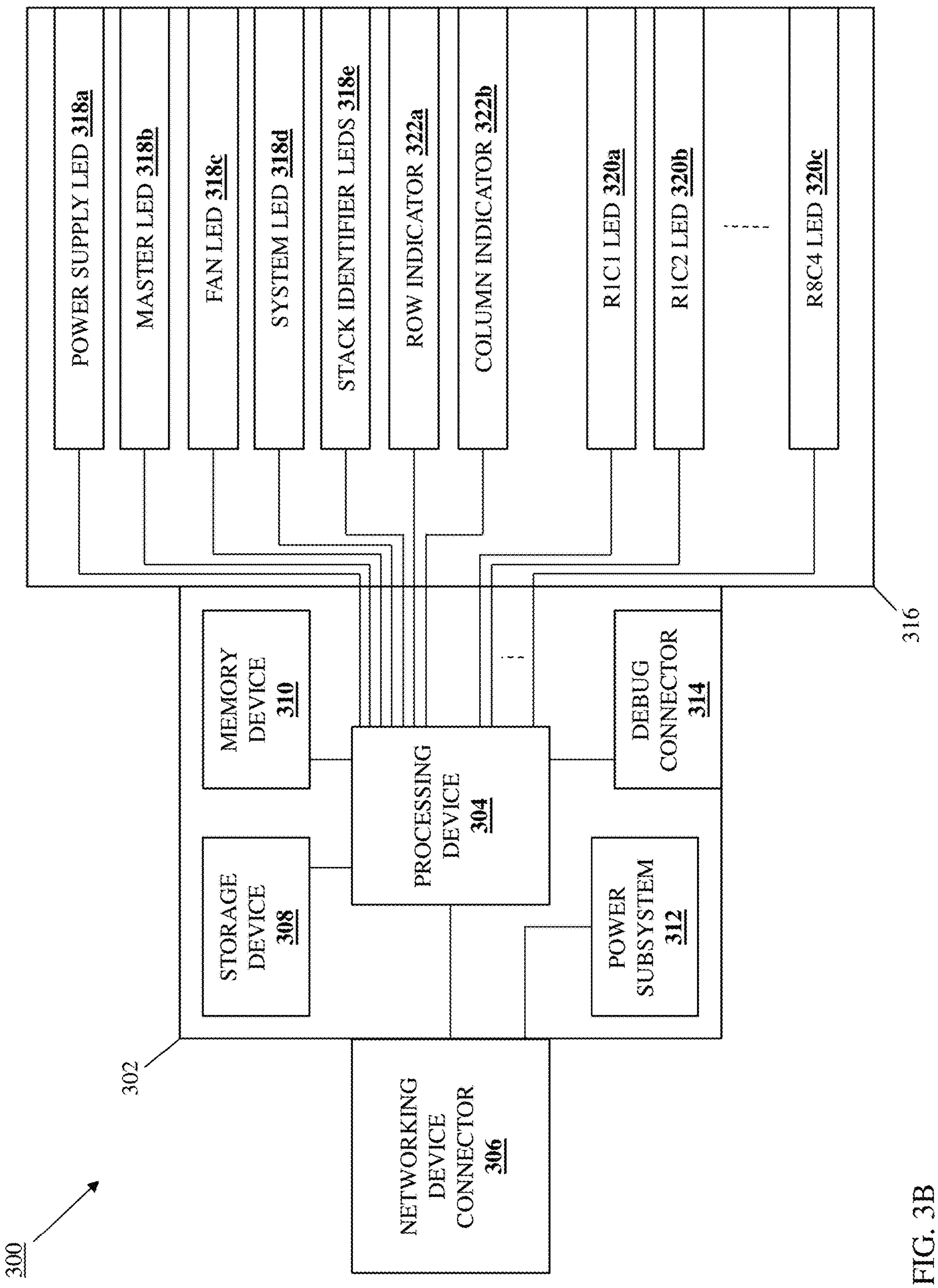
FIG. 3B is a schematic view illustrating an embodiment of the connectable LED system of FIG. 3A.

Referring now to FIGS. 3A and 3B, an embodiment of a connectable LED system 300 is illustrated that may provide the networking device connectable LED system of the present disclosure. The connectable LED system 300 includes a connectable LED system chassis 302 having a top surface 302*a*, a bottom surface 302*b* that is located opposite the connectable LED system chassis 302 from the top surface 302*a*, a front surface 302*c* that extends between the top surface 302*a* and the bottom surface 302*b*, a rear surface (not visible in FIGS. 3A and 3B) that is located opposite the connectable LED system chassis 302 from the front surface 302*c* and that extends between the top surface 302*a* and the bottom surface 302*b*, and a pair of opposing sides surfaces 302*d* and 302*e* that are located opposite the connectable LED system chassis 302 from each other and that extend between the top surface 302*a*, the bottom surface 302*b*, the front surface 302*c*, and the rear surface.

In the illustrated embodiment, a processing device 304 is located in the connectable LED system chassis 302 and may be provided by System on Chip (SoC) with an integrated Field Programmable Gate Array (FPGA) and/or other processing devices that would be apparent to one of skill in the art in possession of the present disclosure. A networking device connector 306 is included on the connectable LED system chassis 302 and coupled to the processing device 304. In the illustrated embodiment, the networking device connector 306 extends from the rear surface 302*c* of the connectable LED system chassis 302, although other networking device connector configurations are envisioned as falling within the scope of the present disclosure as well. In the specific examples provided herein, the networking device connector 306 is provided by a Universal Serial Bus (USB) connector that may be provided by Type-A USB connectors, Type-B USB connectors, or Type-C USB connectors, as well as future USB connector types while remaining within the scope of the present disclosure as well. However, while described as being provided using USB connector technology, one of skill in the art in possession of the present disclosure will appreciate how the networking device connector 306 may be replaced with a connector using other connector technologies that will fall within the scope of the present disclosure as well.

In the illustrated embodiment, a storage device 308 is included in the connectable LED system chassis 302 and coupled to the processing device 304. For example, the storage device 308 may be provided by a solid-state flash storage device that includes flash memory chip(s) that are configured to store the software code that is used by the processing device 304 to initialize the connectable LED system 300, although one of skill in the art in possession of the present disclosure will appreciate how other storage devices storing other information will fall within the scope of the present disclosure as well. A memory device 310 is also included in the connectable LED system chassis 302 and coupled to the processing device 304. For example, the memory device 310 may be provided by Dynamic Random Access Memory (DRAM) device that is configured to store instructions that, when executed by the processing device 304, cause the processing device to provide an LED control subsystem that is configured to perform the functionality of the LED control subsystems and/or connectable LED systems discussed below, although one of skill in the art in possession of the present disclosure will appreciate how other memory devices storing other information will fall within the scope of the present disclosure as well.

In the illustrated embodiment, a power subsystem 312 is included in the connectable LED system chassis 302 and coupled to the networking device connector 306 (as illustrated), as well as the other components in the connectable LED system 300 (not illustrated). For example, the power subsystem 312 may provide power rails that are configured to receive power from the networking device connector 306 (which one of skill in the art in possession of the present disclosure will appreciate may be received from a networking device to which the networking device connector is connected) and provide that power to the components in the connectable LED system 300 in order to allow the functionality described below. As such, specific embodiments of the present disclosure provide the connectable LED system 300 as a "USB powered" device, although the powering of the connectable LED system 300 via other types of connectors and/or batteries will fall within the scope of the present disclosure as well. As illustrated, a debug connector 314 may be included on the connectable LED system chassis 302 and coupled to the processing device 304. In the illustrated embodiment, the debug connector 314 (e.g., a serial debug console connector) is located on the side surface 302*d* of the connectable LED system chassis 302, although other debug connector configurations are envisioned as falling within the scope of the present disclosure as well.

In the illustrated embodiment, an LED sub-chassis 316 is included on the connectable LED system chassis 302. In the illustrated embodiment, the LED sub-chassis 316 is located on the rear surface of the connectable LED system chassis 302, although other LED sub-chassis 316 configurations are envisioned as falling within the scope of the present disclosure as well. The LED sub-chassis 316 includes a plurality of LEDs that are each connected to the processing device 304. For example, in the illustrated embodiment, the LED sub-chassis 316 includes a plurality of "system" LEDs 318 such as the power supply LED 318*a*, master LED 318*b*, fan LED 318*c*, system LED 318*d*, and stack identifier LEDs 318*e* illustrated in FIGS. 3A and 3B. Furthermore, the LED sub-chassis 316 also includes a plurality of "switchport" LEDs 320 that are provided in the illustrated embodiment in an 8×4 row/column grid and that include a Row 1 Column 1 (R1C1) LED 320*a*, a Row 1 Column 2 (R1C2) LED 320*b*, and up to a Row 8 Column 4 (R8C4) LED 320*c*. However, while illustrated as provided in a particular 8×4 row/column grid, one of skill in the art in possession of the present disclosure will appreciate how other LED configurations (e.g., a 4×8 row/column grid as well as any other LED configurations that would be apparent to one of skill in the art in possession of the present disclosure) will fall within the scope of the present disclosure as well. In the illustrated embodiment, the LED sub-chassis 316 includes a row indicator 322*a* (e.g., R1-R8) and a column indicator 322*b* (e.g., C1-C4) that may be illuminated to identify the rows and columns of the plurality of "switchport" LEDs 320.

In the specific example illustrated in FIG. 3A, the networking device connector 306 may include a length L1 that is greater than 27 mm to provide sufficient clearance for management cabling connected to the management ports 212 when the connectable LED system 300 is connected to the USB port 214, although one of skill in the art in possession of the present disclosure will appreciate how other ports configurations may allow the length of the networking device connector 306 to be modified from that illustrated and described above. Similarly, the connectable LED system chassis 302 may include a length L2 and a height H2 to provide sufficient clearance for management cabling connected to the management ports 212 when the connectable LED system 300 is connected to the USB port 214, with the length L1 of the networking device connector 306 and the length L2 of the connectable LED system chassis 302 configured to position the LED sub-chassis 316 a distance from the networking device 200 that is greater than a bend radius of the management cabling that connects to the management ports 212, and the height H2 of the connectable LED system chassis 302 constrained by the distance between the management ports 212, although one of skill in the art in possession of the present disclosure will appreciate how other ports configurations may allow the length and height of the connectable LED system chassis 302 to be modified from that illustrated.

In the specific example illustrated in FIG. 3A, the LED sub-chassis 316 may include a height H1 and a width W1, with the height H1 less than or equal to 1 Rack Unit (1RU) and the width W1 less than 1RU. As illustrated, the LED sub-chassis 316 dimensioned as described above can adequately house the five system LEDs 318 and the thirty-two switchport LEDs 320 illustrated in the specific example provided in FIG. 3A, with the switchport LEDs 320 provided in an 8×4 row/column grid. As such, a 32-port networking device may have each of its ports "mapped" (as discussed below) to a respective tri-color LED. However, while a specific connectable LED system 300 has been illustrated and described, one of skill in the art in possession of the present disclosure will appreciate how the connectable LED system of the present disclosure may include other components and/or configuration in order to enable the functionality described below while remaining within the scope of the present disclosure as well.

Figure 4:
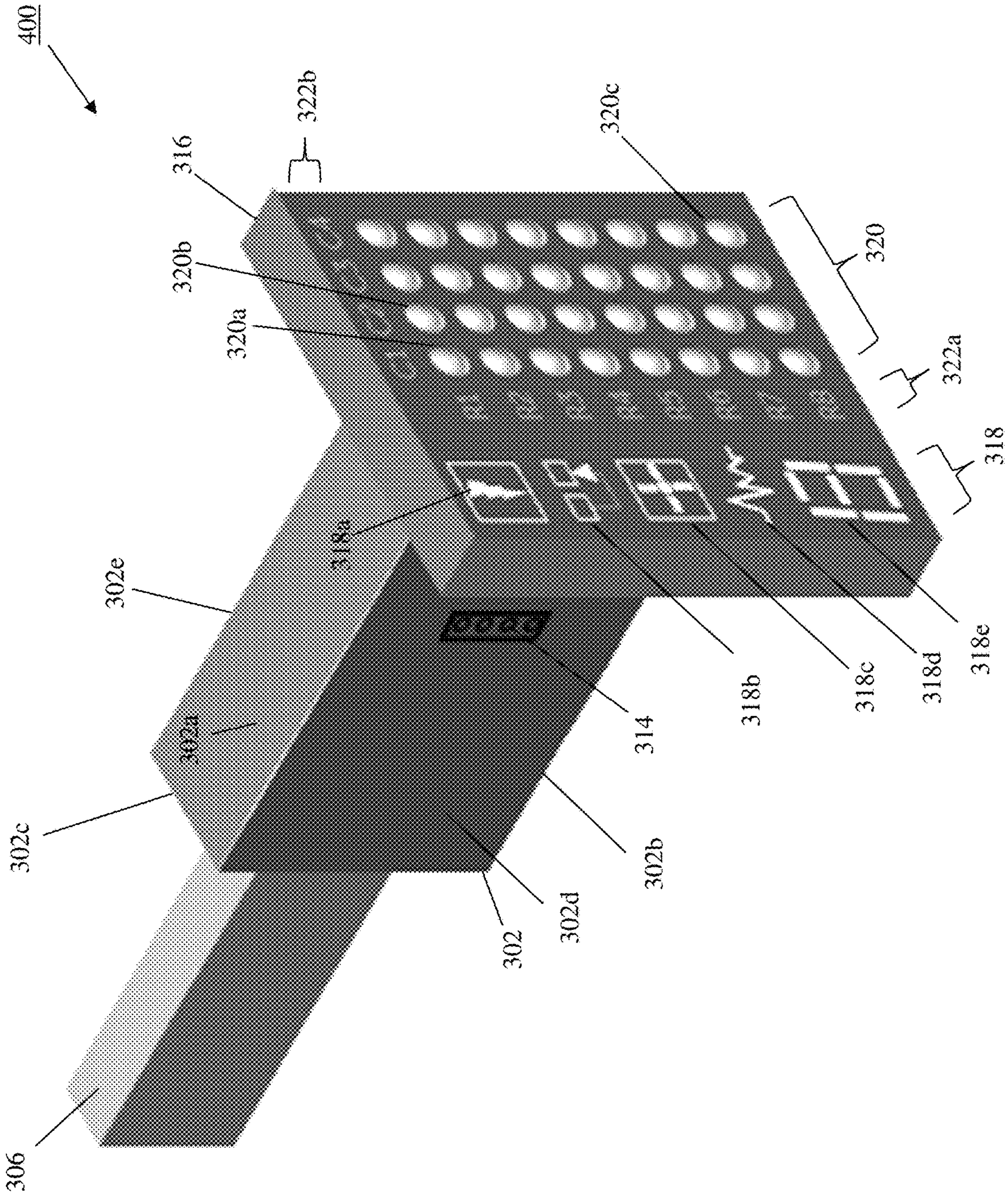
FIG. 4 is a perspective view illustrating an embodiment of a connectable LED system that may be provided according to the teachings of the present disclosure.

For example, FIG. 4 illustrates an embodiment of a connectable LED system 400 that is substantially similar to the connectable LED system 300, with similar elements provided with similar element numbers. As will be appreciated by one of skill in the art in possession of the present disclosure, the connectable LED system 400 differs from the connectable LED system 300 in that the connectable LED system chassis 302 and the networking device connector 306 are rotated by 90 degrees in order to allow the networking device connector 306 to be connected to the USB port 214 on the networking device 200 when that USB port 214 is provided in a "vertical" orientation (i.e., rather than a "horizontal" orientation USB port used with the connectable LED system 300) while still providing the LED sub-chassis 316 in the orientation illustrated in FIG. 4.

As will be appreciated by one of skill in the art in possession of the present disclosure, in some examples, the connectable LED systems 300 and 400 may be provided as separate connectable LED systems having the differently oriented networking device connectors 306 illustrated in FIGS. 3 and 4. However, in other examples, the LED sub-chassis 316 may be rotatable relative to the networking device connector 306 (e.g., via a rotatable coupling between the connectable LED system chassis 302 and the LED sub-chassis 316 as illustrated, via a rotatable coupling between the connectable LED system chassis 302 and the networking device connector 306, etc.) while remaining within the scope of the present disclosure as well. As such, a wide variety of modification to the connectable LED system described herein is envisioned as falling within the scope of the present disclosure.

Figure 5:
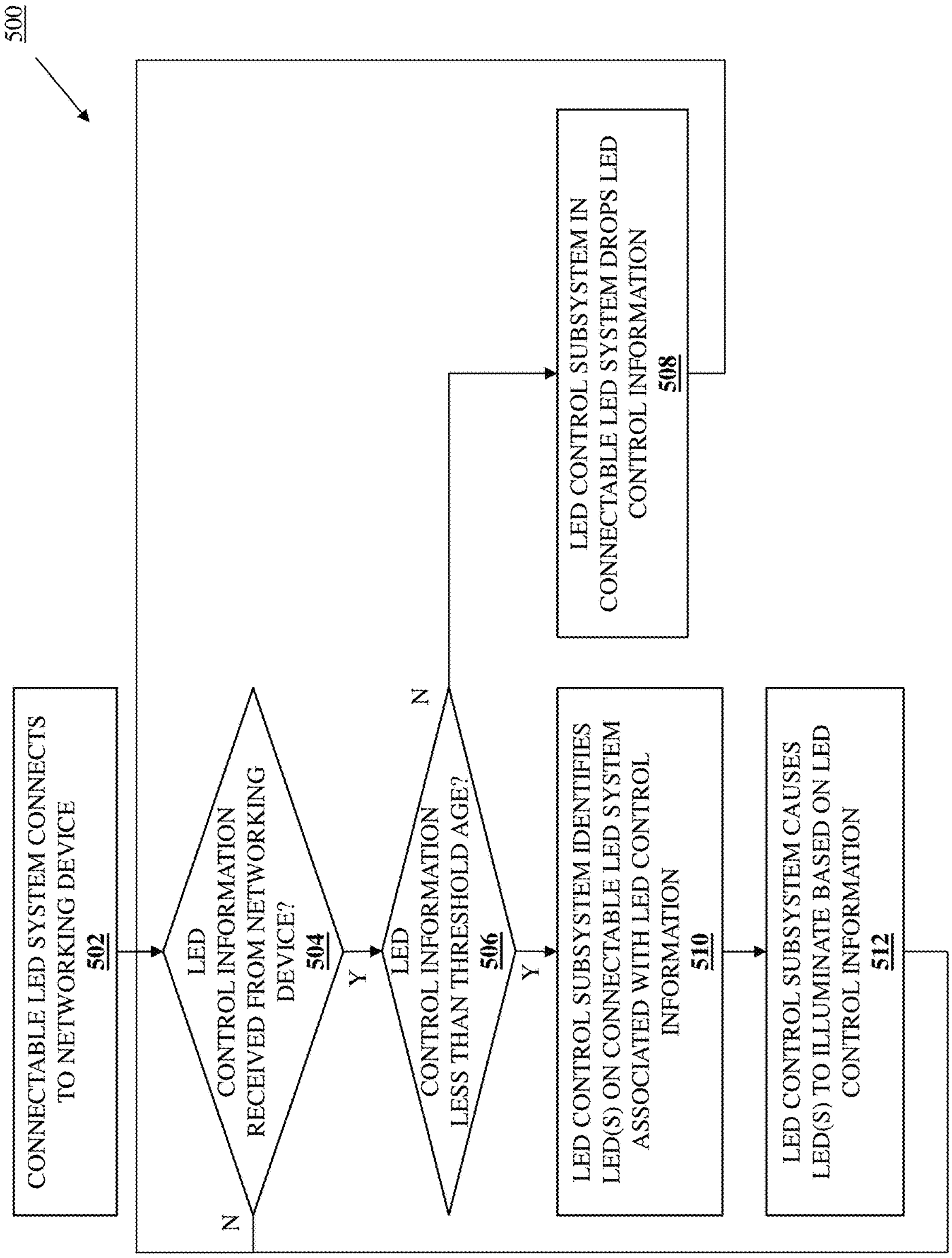
FIG. 5 is a flow chart illustrating an embodiment of a method for displaying information about ports on a networking device using a connectable LED system.

Referring now to FIG. 5, an embodiment of a method 500 for displaying information about ports on a networking device using a connectable Light Emitting Device (LED)

system is illustrated. As discussed below, the systems and methods of the present disclosure provide a connectable LED system that includes a plurality of LEDs and that is configured to connect to a first port on a networking device, receive LED control information from the networking device, and use that LED control information to illuminate any of the plurality of LEDs that are mapped to second ports or other subsystems in the networking device in order to display information associated with those second ports or subsystems. For example, the networking device connectable LED system of the present disclosure may include a connectable LED system chassis, a networking device connector on the connectable LED system chassis, LEDs on the connectable LED system chassis, and an LED control subsystem in the connectable LED system chassis that is coupled to the networking device connector and the LEDs. The LED control subsystem receives, via the networking device connector when it is connected to a networking device via a first port of a plurality of ports that are included on the networking device, second port LED control information that is associated with the operation of a second port that is included in the plurality of ports. The LED control subsystem then identifies a second port LED that is included in the LEDs and that is mapped to the second port, and causes the second port LED to illuminate based on the second port LED control information.

Figure 6A:
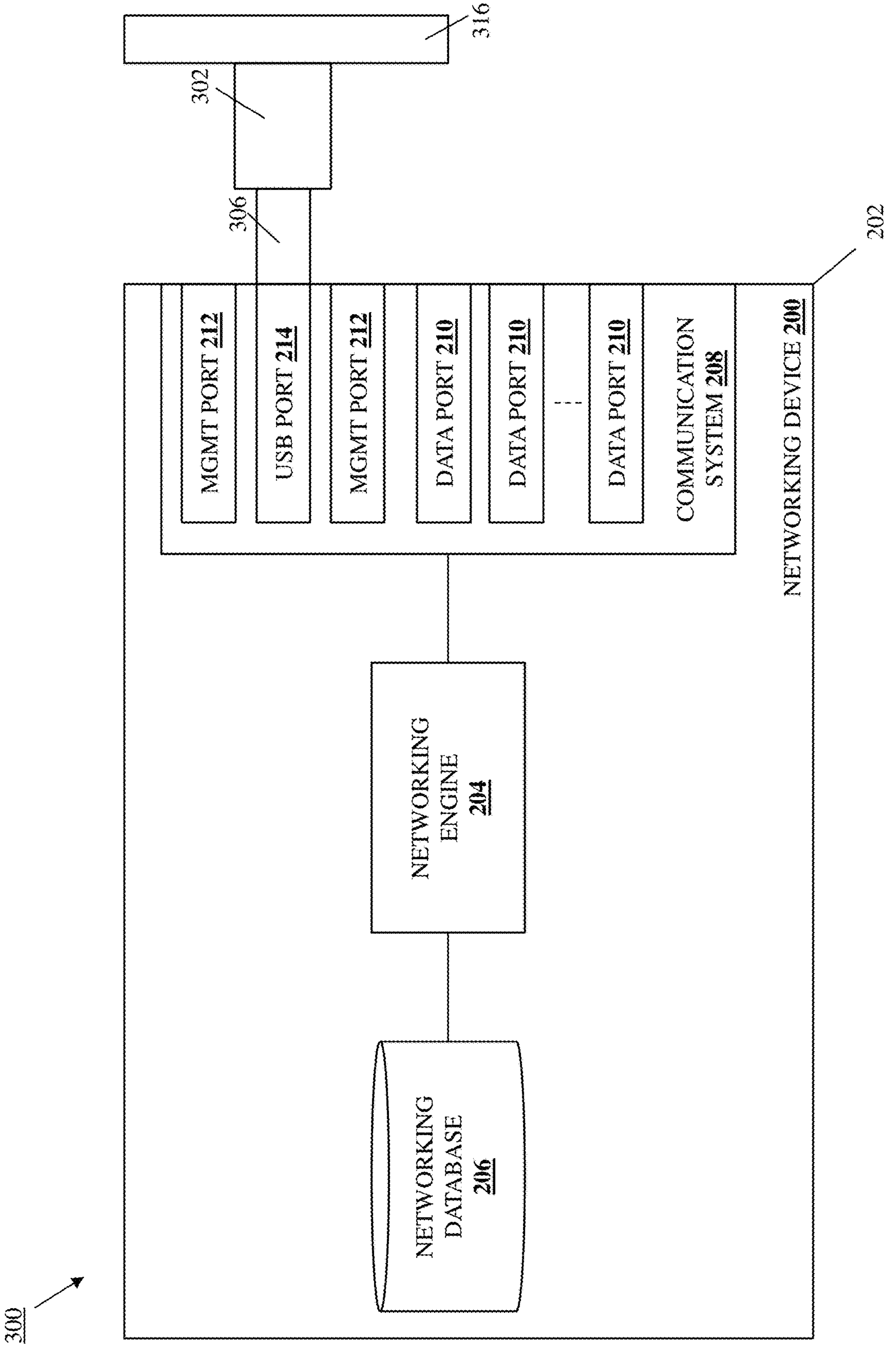
FIG. 6A is a schematic view illustrating an embodiment of the connectable LED system of FIGS. 3A and 3B connected to the networking device of FIGS. 2A and 2B.
Figure 6B:
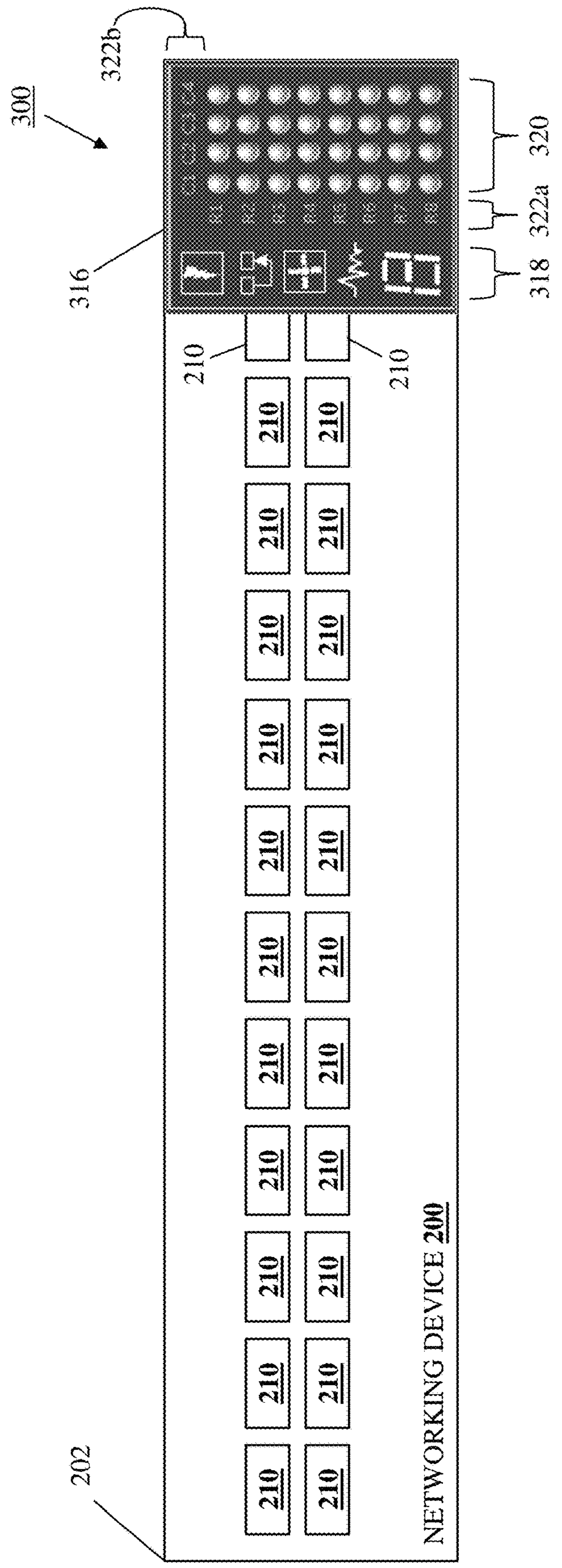
FIG. 6B is a front view illustrating an embodiment of the connectable LED system connected to the networking device in FIG. 6A.

The method 500 begins at block 502 where a connectable LED system connects to a networking device. With reference to FIGS. 6A and 6B, in an embodiment of block 502, the connectable LED system 300 discussed above with reference to FIGS. 3A and 3B may be positioned adjacent the communication system 208 on the networking device 200 (e.g., adjacent a front panel or other outer surface on the networking device 200) such that the networking device connector 306 is aligned with the USB port 214. The connectable LED system 300 may then be moved towards the networking device 200 such that the networking device connector 306 on the networking device 200 engages the USB port 214 and connects the connectable LED system 300 to the networking device 200, as illustrated in FIG. 6A. As can be seen in the embodiment illustrated in FIG. 6B, the provisioning of the networking device 200 and the LED sub-chassis 316 on the connectable LED system 300 with 1RU heights will prevent the LED sub-chassis 316 from extending beyond a top surface and bottom surface of the networking device 200, allowing the connectable LED system 300 to be used with the networking device 200 when the networking device 200 is positioned in a 1RU slot in a rack.

However, while a specific example of a 1RU networking device/connectable LED system combination has been illustrated and described, one of skill in the art in possession of the present disclosure will appreciate how other height networking devices and/or connectable LED systems (e.g., 2RU height networking devices and/or connectable LED systems) will fall within the scope of the present disclosure as well. Furthermore, one of skill in the art in possession of the present disclosure will appreciate how the examples illustrated and described below include the USB port 214 provided on the networking device 200 in a "horizontal" orientation, and how the connectable LED system 400 discussed above with reference to FIG. 4 may be utilized in substantially the same manner described below when the USB port 214 is provided on the networking device 200 in a "vertical" orientation.

Figure 6C:
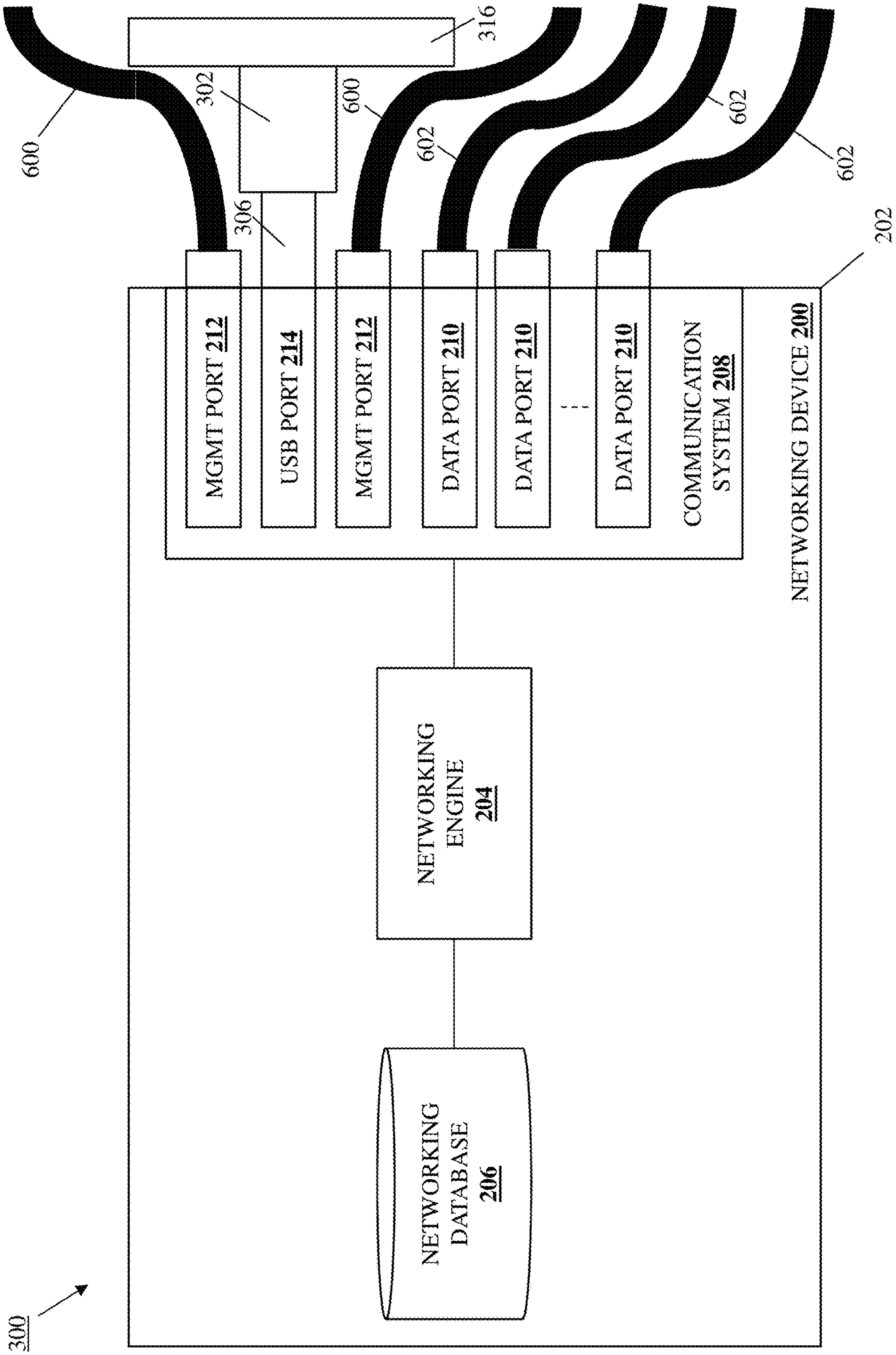
FIG. 6C is a schematic view illustrating an embodiment of the connectable LED system of FIGS. 3A and 3B connected to the networking device of FIGS. 2A and 2B.

As can be seen in FIG. 6C, cabling systems may then be connected to the networking device 200, with the illustrated embodiment including respective management cabling systems 600 being connected to each of the management ports 212 on the communication system 208 in the networking device 200, and respective data cabling systems 602 being connected to the data ports 210 on the communication system 208 in the networking device 200. As can be seen in the embodiment illustrated in FIG. 6C, and as described above, the networking device connector 306 and the connectable LED system chassis 302 may be dimensioned to provide sufficient clearance for the management cabling systems 300 connected to the management ports 212 when the connectable LED system 300 is connected to the USB port 214, with the LED sub-chassis 316 positioned a distance from the networking device 200 that accommodates a bend radius of the management cabling systems 600.

The method 500 then proceeds to decision block 504 where it is determined whether LED control information has been received from the networking device. In an embodiment, at decision block 504 and following the connection of the connectable LED system 300 to the networking device 200, the components in the connectable LED system 300 may receive power from the networking device 200 via the networking device connector 306 and the power subsystem 312 and, in response, the LED control subsystem provided in the connectable LED system 300 may access the software code stored in the storage device 308 and use that software code to initialize the connectable LED system 300. Furthermore, in response to the connectable LED system 300 being connected to the USB port 214 in the communication system 208 on the networking device 200, the networking engine 204 (e.g., a networking operating system provided by the networking engine 204) may detect the connectable LED system 300 by, for example, identifying a class identifier, a vendor identifier, a product identifier, and/or other identifiers that would be apparent to one of skill in the art in possession of the present disclosure and that may be stored in an Electrically Erasable Programmable Read-Only Memory (EEPROM) device included in the connectable LED system 300.

In response to identifying the connectable LED system 300, the networking engine 204 may configure a driver such as, for example, a serial-over-USB driver in this specific embodiment for use in communicating with and/or otherwise performing the functionality discussed below with the connectable LED system 300. In the examples described below, the serial-over-USB driver allows the networking engine 204 to stream protocol buffer ("ProtoBuf") messages over a serial-to-USB channel in order to provide for the communications and/or other functionality between the networking device 200 and the connectable LED system 300 described below, although one of skill in the art in possession of the present disclosure will appreciate how other communication techniques will fall within the scope of the present disclosure as well. In addition, the networking engine 204 may utilize a clock (e.g., a Real-Time Clock (RTC) using a Network Time Protocol (NTP)) that is accessible to the networking device 204 to update/synchronize a clock that is accessible to the LED control subsystem provided by the connectable LED system 300. However, while several specific examples of the initialization of the connectable LED system 300 have been described, one of skill in the art in possession of the present disclosure will appreciate how the connectable LED system 300 may be initialized in a variety of manners that will fall within the scope of the present disclosure.

Following the initialization of the connectable LED system 300, the LED control subsystem included in the connectable LED system 300 may monitor for LED control information from the networking engine 204 in the networking device 200. If, at decision block 504, it is determined that LED control information has not been received from the networking device, the method 500 returns to decision block 504. As such, the method 500 may loop such that the LED control subsystem included in the connectable LED system 300 monitors for LED control information from the networking engine 204 in the networking device 200 until LED control information is received.

If, at decision block 504, it is determined that LED control information has been received from the networking device, the method 500 proceeds to decision block 506 where it is determined whether the LED control information is less than a threshold age. In an embodiment, at decision block 504, the networking engine 204 in the networking device may perform LED control information generation operations that may include generating LED control information associated with the operation of any of the ports 210, 212, and/or 214 included in the communication system 208 and/or other subsystems included in the networking device 200. For example, at decision block 504, the operation of any of the ports 210, 212, and/or 214 included in the communication system 208 and/or other subsystems included in the networking device 200 may be monitored and identified by the networking engine 204 in the networking device 200.

As such, in some embodiments of decision block 504, the networking engine 204 (e.g., a networking operating system provided by the networking engine 204) may monitor and identify (e.g., sample) operation data (e.g., status and/or activity data) generated in response to the operation of any of the data ports 210, which may include data indicating an "up" status of that data port 210, a "down" status of that data port 210, an error condition in that data port 210, a port speed of that data port 210, a number of data packets transmitted and/or received in some time period by that data port 210, and/or any other switchport status and/or activity data that would be apparent to one of skill in the art in possession of the present disclosure. Furthermore, while the monitoring and identification of operation data generated in response to the operation of any of the data ports 210 has been described, one of skill in the art in possession of the present disclosure will appreciate how operation data generated in response to the operation of either of the management ports 212, the USB port 214, and/or any other port on the networking device 200 may be monitored and identified while remaining within the scope of the present disclosure as well.

In other embodiments of decision block 504, the networking engine 204 may provide the ability to the utilize the connectable LED system 300 to subsystems in the networking device 200 (e.g., via an Application Programming Interface (API)), and thus those subsystems may generate operation data in response to the operation of any of those subsystems and provide that operation data to a networking operating system provided by the networking engine 204, which may include operation data indicating the operation of a power supply subsystem in the networking device 200 (e.g., for use in controlling the power supply LED 318*a*); operation data indicating the operation of the networking device 200 as a stack master or a stack slave when configured as part of a stack subsystem (e.g., for use in controlling the master LED 318*b*), operation data indicating the operation of a fan subsystem in the networking device 200 (e.g., for use in controlling the fan LED 318*c*), operation data indicating the operation of the networking device 200 with regard to normal operations, boot operations, critical system errors, non-critical system errors, fan failures, power supply failures, and/or other system operations known in the art (e.g., for use in controlling the system LED 318*d*); operation data indicating the operation of the networking device 200 in a stack subsystem that includes other networking devices (e.g., for use in controlling the stack identifier LEDs 318*e*); and/or any other subsystem operation data that would be apparent to one of skill in the art in possession of the present disclosure.

Figure 7A:
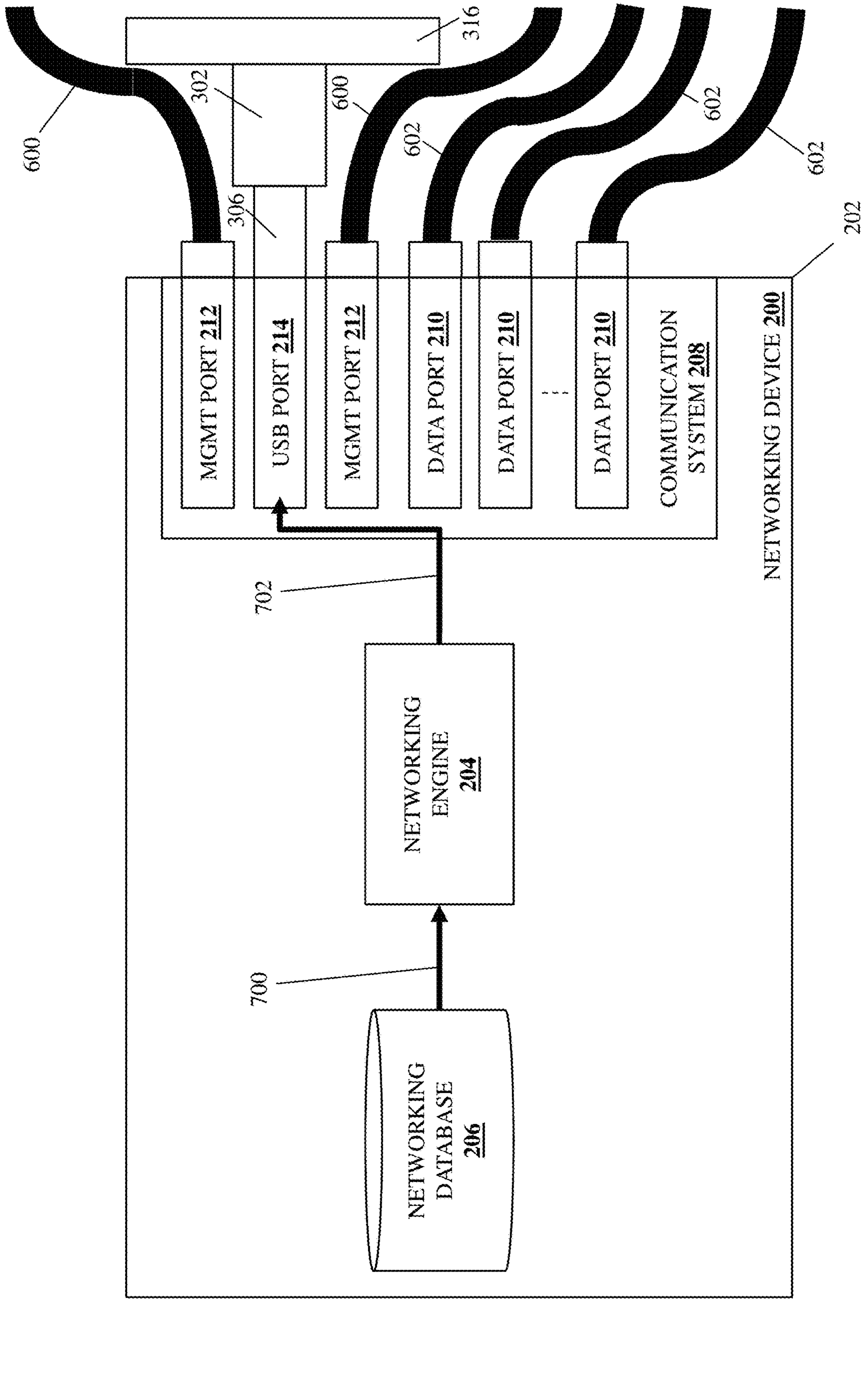
FIG. 7A is a schematic view illustrating an embodiment of the connectable LED system and the networking device of FIG. 6C operating during the method of FIG. 5.

With reference to FIG. 7A, in an embodiment of decision block 504 and in response to receiving operation data associated with the operation of ports and/or subsystems in the networking device 200, the networking engine 204 in the networking device 200 may perform LED control information generation operations 700 that may include determining a mapping between the port(s) and/or subsystems whose operation is associated with the operation data that was received, and LED(s) included on the connectable LED system 300. As discussed in further detail below, the networking database 206 may be provided with a port/subsystem-to-LED mapping that may be configured by a user of the networking device 200/connectable LED system 300, and thus at decision block 504 the networking engine 204 may access that port/subsystem-to-LED mapping to identify LED(s) mapped to the port(s) and/or subsystems whose operation is associated with the operation data that was received. However, while a specific example of identifying LEDs on the connectable LED system associated with operating data that was received has been described, one of skill in the art in possession of the present disclosure will appreciate how other techniques for identifying LEDs on the connectable LED system associated with received operating data will fall within the scope of the present disclosure as well.

In an embodiment, the LED control information generation operations 700 may also include generating LED control information based on the mapping determined between the LED(s) included on the connectable LED system 300 and the port(s) and/or subsystems whose operation is associated with the operation data that was received. Using the specific example provided above in which the operating data is associated with one of the data ports 210 in the communication system 208 of the networking device 200, the networking engine 204 in the networking device 200 may generate LED control information that includes a protocol buffer ("ProtoBuf") message having the operation data, an identifier for the data port 210 (and a connection if the data port 210 is configured in a breakout mode with a plurality of connections), an identifier for the LED(s) on the connectable LED system 300 that are mapped to that data port 210 (e.g., in terms of a row position and column position of that LED in this specific example), a timestamp for the time at which the operation data was generated (e.g., sampled), a monotonically increasing sequence number associated with operation data from that data port 210, and/or any other LED control information that one of skill in the art in possession of the present disclosure would appreciate as providing the functionality described below.

Using the specific example provided above in which the operation data is associated with one of the subsystems in the networking device 200, the networking engine 204 in the networking device 200 may generate LED control information that includes a protocol buffer ("ProtoBuf") message having an identifier for the LED(s) on the connectable LED system 300 that are mapped to that subsystem (e.g., in terms of a row position and column position of that LED in this specific example), a subsystem status corresponding to the operation data, a timestamp for the time at which the operation data was generated (e.g., a time at which the API was called by that subsystem), and/or any other LED control information that one of skill in the art in possession of the present disclosure would appreciate as providing the functionality described below. However, while specific examples of LED control information for the data ports 210 and subsystems in the networking device 200 has been described, one of skill in the art in possession of the present disclosure will appreciate how other LED control information for data ports and subsystems, as well as LED control information for other ports and subsystems, will fall within the scope of the present disclosure as well.

Figure 7B:
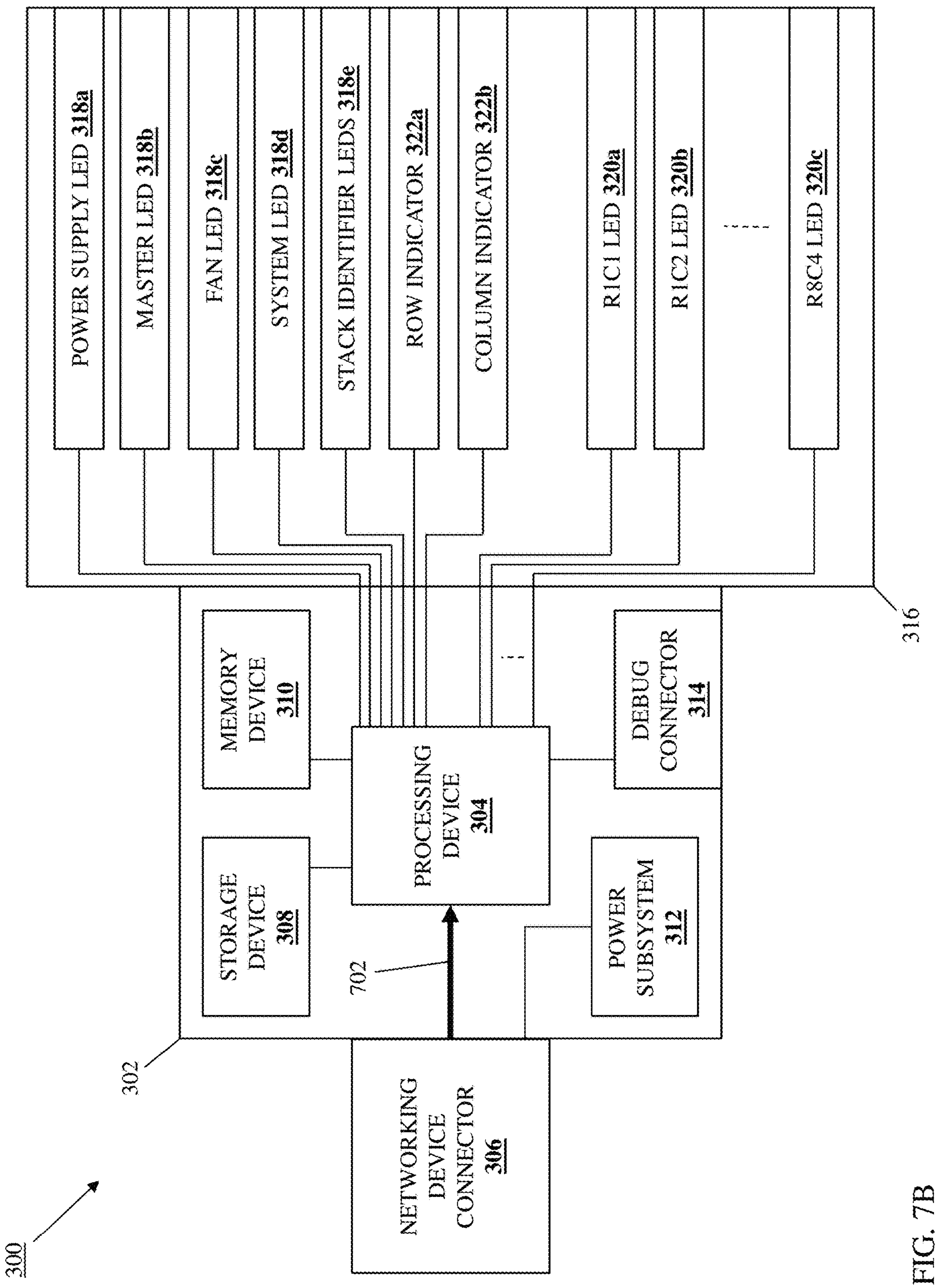
FIG. 7B is a schematic view illustrating an embodiment of the connectable LED system of FIG. 3B operating during the method of FIG. 5.

With reference to FIGS. 7A and 7B, the networking engine 204 in the networking device 200 may perform LED control information transmission operations 702 that may include transmitting the LED control information via the USB port 214 in the communication system 208 of the network device 200 such that it is received by the processing system 304 in the connectable LED system 300 that is coupled to the networking device connector 306 and that provides the LED control subsystem. In an embodiment, at decision block 506 and in response to receiving the LED control information, the LED control subsystem in the connectable LED system 300 may determine whether that LED control information is more than a threshold age (e.g., X milliseconds). For example, at decision block 506, the LED control subsystem in the connectable LED system 300 may identify the timestamp included in the protocol buffer (ProtoBuf) message providing the LED control information, and compare that timestamp to a current time indicated by the clock that is accessible to the LED control subsystem and that was previously updated/synchronized with the networking engine 204 in order to determine whether that LED control information is more than the threshold age.

As will be appreciated by one of skill in the art in possession of the present disclosure, any of a variety of threshold age(s) for the operation data and corresponding LED control information for the data ports 210 and subsystems in the networking device 200 discussed above may be defined by the manufacturer of the networking device 200 and/or the connectable LED system 300 in order to allow a determination of whether that operation data/LED control information is recent enough to display, and thus any of those threshold age(s) are envisioned as falling within the scope of the present disclosure. Furthermore, while a specific example of determining whether LED control information should be displayed is provided herein, one of skill in the art in possession of the present disclosure will recognize that determinations of whether to display the LED control information described herein may be made using other techniques that will fall within the scope of the present disclosure as well.

If, at decision block 506, it is determined that the LED control information is more than a threshold age, the method 500 proceeds to block 508 where an LED control subsystem in the connectable LED system drops the LED control information. In an embodiment, at block 508 and in response to determining that LED control information received from the networking engine 204 in the networking device 200 is more than the threshold age, the LED control subsystem provided in the connectable LED system 300 will drop that LED control information such that it is not used to illuminate any LEDs included on the connectable LED system 300. The method 500 may then return to decision block 504. As such, the method 500 may loop such that the LED control subsystem provided in the connectable LED system 300 drops any LED control information received from the networking engine 204 in the networking device 200 that is more than the threshold age.

If at decision block 506, it is determined that the LED control information is less than the threshold age, the method 500 proceeds to block 510 where the LED control subsystem identifies one or more LEDs on the connectable LED system associated with the LED control information. In an embodiment, at block 510 and in response to determining that LED control received from the networking engine 204 in the networking device 200 is less than the threshold age, the LED control subsystem provided in the connectable LED system 300 will identify LEDs included on the connectable LED system 300 that are associated with the LED control information received from the networking engine 204 in the networking device 200 at decision block 504. For example, at block 510, the LED control subsystem provided in the connectable LED system 300 may identify LEDs on the connectable LED system 300 that are mapped to ports or subsystems in the networking device 200 via the identification of those LEDs in the protocol buffer (ProtoBuf) message that provide the LED control information. However, while the networking engine 204 in the networking device 200 is described as identifying the LEDs on the connectable LED system 300 that are mapped to its ports or subsystems in the LED control information, one of skill in the art in possession of the present disclosure will appreciate how such mappings may be stored in the connectable LED system 300 and identified by the LED control subsystem provided in the connectable LED system 300 while remaining within the scope of the present disclosure as well.

Figure 8A:
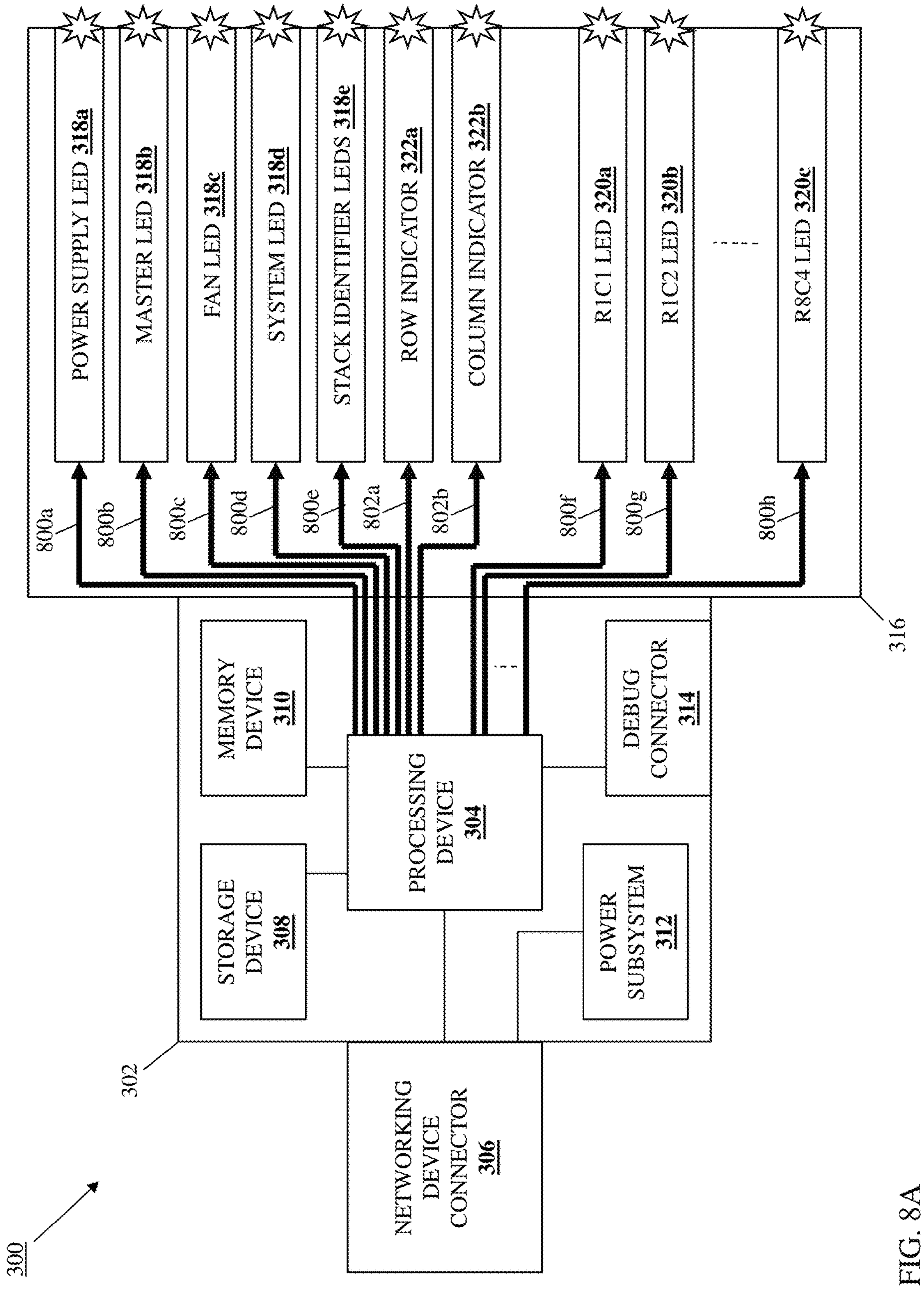
FIG. 8A is a schematic view illustrating an embodiment of the connectable LED system of FIG. 3B operating during the method of FIG. 5.
Figure 8B:
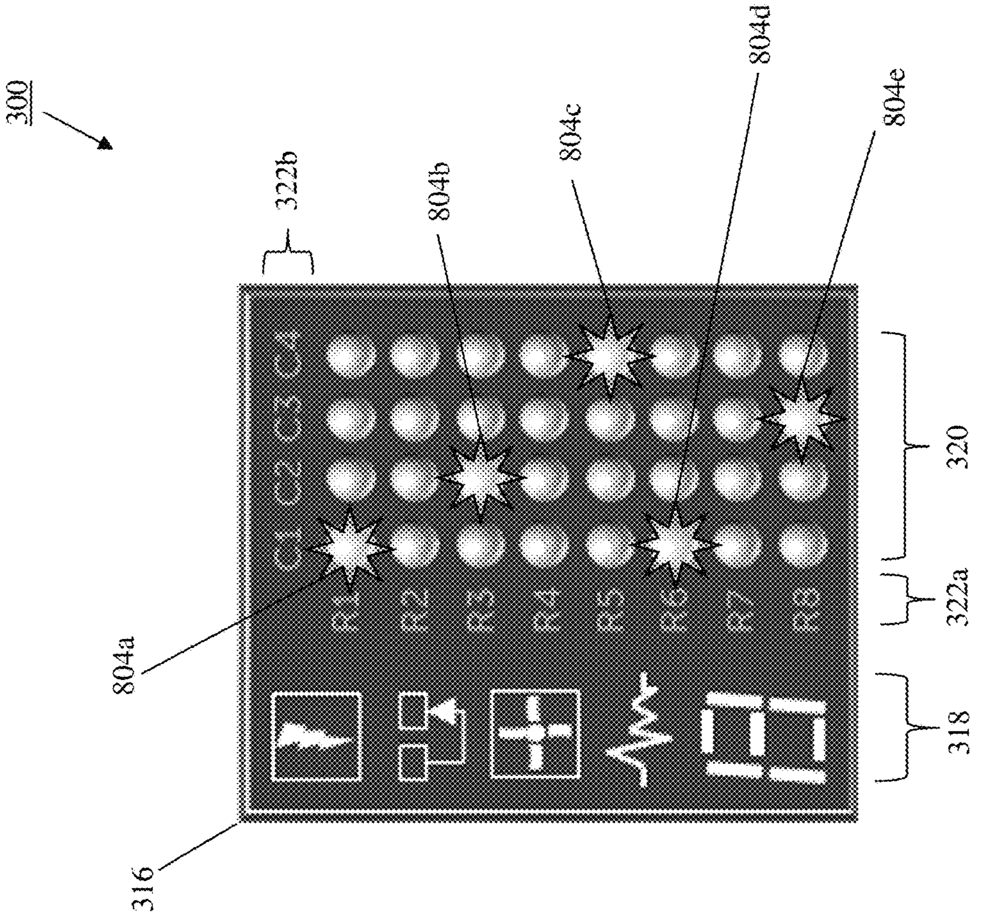
FIG. 8B is a front view illustrating an embodiment of the connectable LED system of FIG. 3A operating during the method of FIG. 5.

The method 500 then proceeds to block 512 where the LED control subsystem causes the LED(s) to illuminate based on the LED control information. With reference to FIGS. 8A and 8B, in an embodiment of block 512, the processing system 304 in the connectable LED system 300 that provides the LED control subsystem may perform LED illumination operations that may include utilizing the LED control information to illuminate any of the LEDs included on the connectable LED system 300. As will be appreciated by one of skill in the art in possession of the present disclosure, the illumination of any of the LEDs based on the LED control information at block 512 may include causing that LED to emit a "solid" light, causing that LED to "blink" at any of a variety of different rates, causing that LED to emit any of a variety of colors of light, and/or causing that LED to provide any other LED illumination characteristics that one of skill in the art in possession of the present disclosure will appreciate are configured to convey information about the operation of ports and/or subsystems in the networking device 200.

For example, FIG. 8A illustrates how the LED control subsystem may perform power supply LED illumination operations 800*a* to illuminate the power supply LED 318*a*, master LED illumination operations 800*b* to illuminate the master LED 318*b*, fan LED illumination operations 800*c* to illuminate the fan LED 318*c*, system LED illumination operations 800*d* to illuminate the system LED 318*d*, stack identifier LED illumination operations 800*e* to illuminate one or more of the stack identifier LEDs 318*e*, R1C1 LED illumination operations 800*f* to illuminate the R1C1 LED 320*a*, R1C2 LED illumination operations 800*g* to illuminate the R1C2 LED 320*b*, and up to R8C4 LED illumination operations 800*h* to illuminate the R8C4 LED 320*c*. Furthermore, as illustrated, the LED control subsystem provided in the connectable LED system 300 may perform row indicator illumination operations 802*a* to illuminate the row indicator 322*a*, as well as column indicator illumination operations 802*b* to illuminate the column indicator 322*b*, which one of skill in the art in possession of the present disclosure will allow a user to easily identify the row and column numbers for any R1C1-R4C8 LED that is illuminated.

As such, one of skill in the art in possession of the present disclosure will appreciate how FIG. 8B illustrates a specific example in which the LED illumination operations performed at block 512 have caused an illumination 804*a* the R1C1 LED, an illumination 804 of the R3C2 LED, an illumination 804*c* of the R5C4 LED, an illumination 804*d* of the R6C1 LED, and an illumination 804*e* of the R8C3 LED. In an embodiment, the LED control subsystem provided in the connectable LED system 300 may maintain a state for each LED included on the connectable LED system 300, and may utilized operation data included in any LED control information that identifies or is otherwise used to illuminate an LED to reconstruct operation data for a port or subsystem in the networking device 200 (e.g., based on the sequence numbers described above). As such, continuing with the specific examples provided above, the LED control subsystem provided in the connectable LED system 300 may decode operation data included in a protocol buffer ("ProtoBuf") message received from the networking engine 204 in the networking device 200, merge that operation data with a maintained state of corresponding LED(s) identified in the that protocol buffer ("ProtoBuf") message, and update the illumination of those LED(s) accordingly.

The method 500 returns to decision block 504. As such, the method 500 may loop such that the LED control subsystem provided in the connectable LED system 300 illuminates LEDs included thereon based on LED control information received from the networking engine 204 in the networking device 200 that is less than the threshold age.

As discussed above, any ports and/or subsystems in the networking device 200 may be mapped to LEDs included on the connectable LED system 300. For example, with reference to FIGS. 9A, 9B, and 9C, different mappings between the data ports 210 on the communication system 208 in the networking device 200 and the LEDs included on the connectable LED system 300 are illustrated and described. However, while only described for the data ports 210, one of skill in the art in possession of the present disclosure will appreciate how the mapping of other ports on the communication system 208 in the networking device 200 to the LEDs included on the connectable LED system 300, and/or the mapping of subsystems in the networking device 200 to the LEDs included on the connectable LED system 300, may be provided and remapped similarly as described for the data ports 210 below.

Figure 9A:
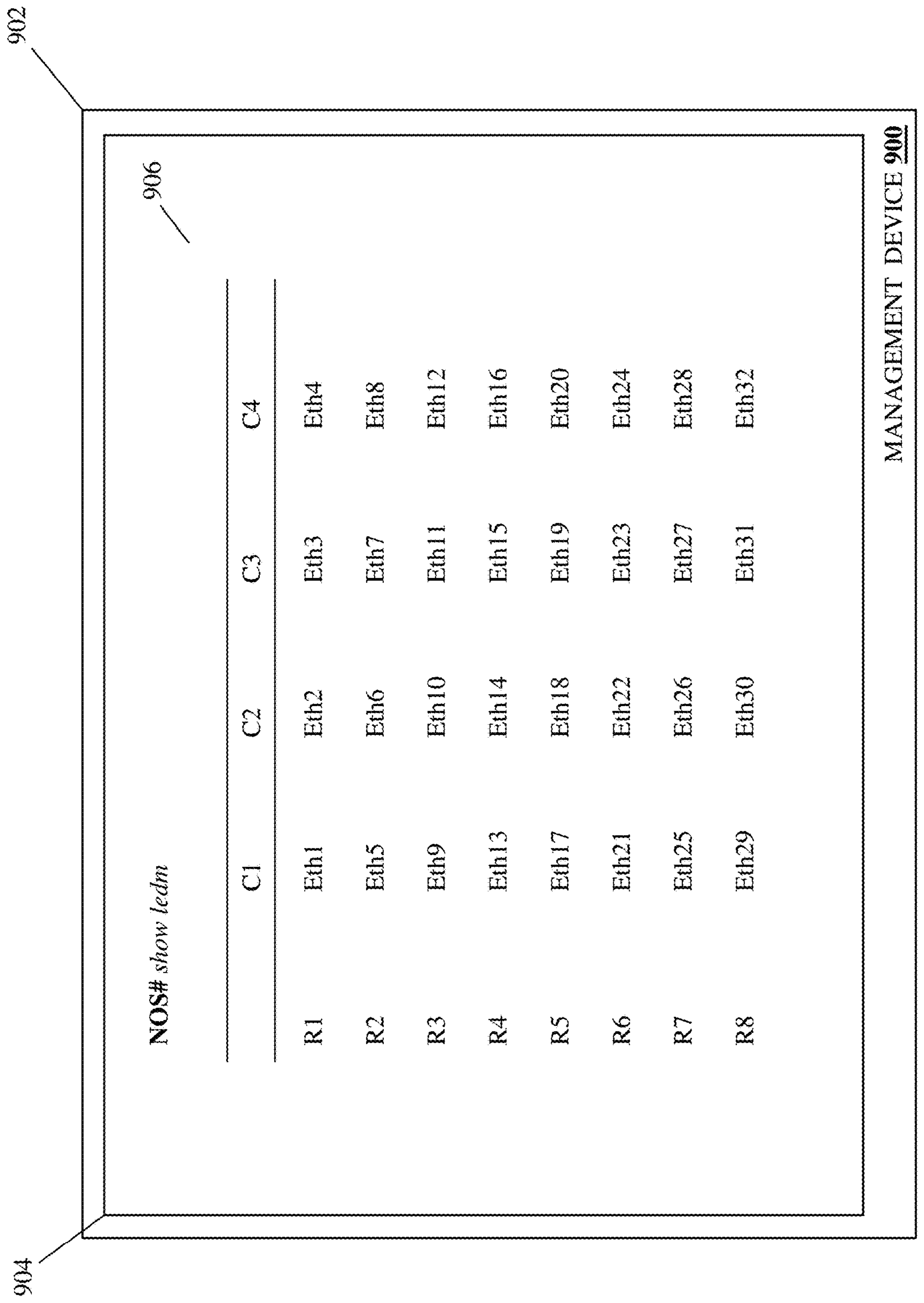
FIG. 9A is a screen-shot view illustrating an embodiment of a management device being used to configure the operation of the connectable LED system of FIGS. 3A and 3B.
Figure 9B:
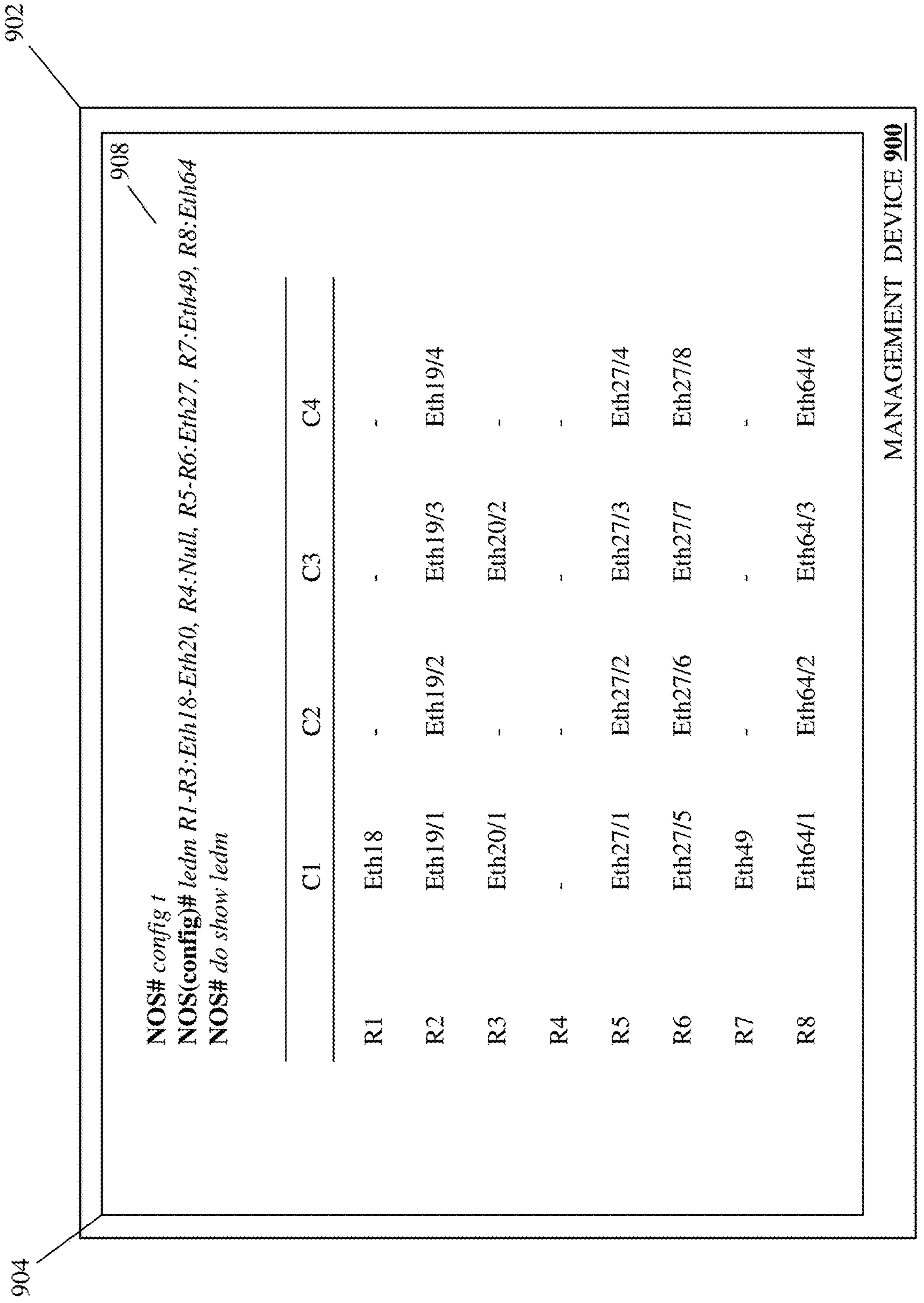
FIG. 9B is a screen-shot view illustrating an embodiment of a management device being used to configure the operation of the connectable LED system of FIGS. 3A and 3B.
Figure 9C:
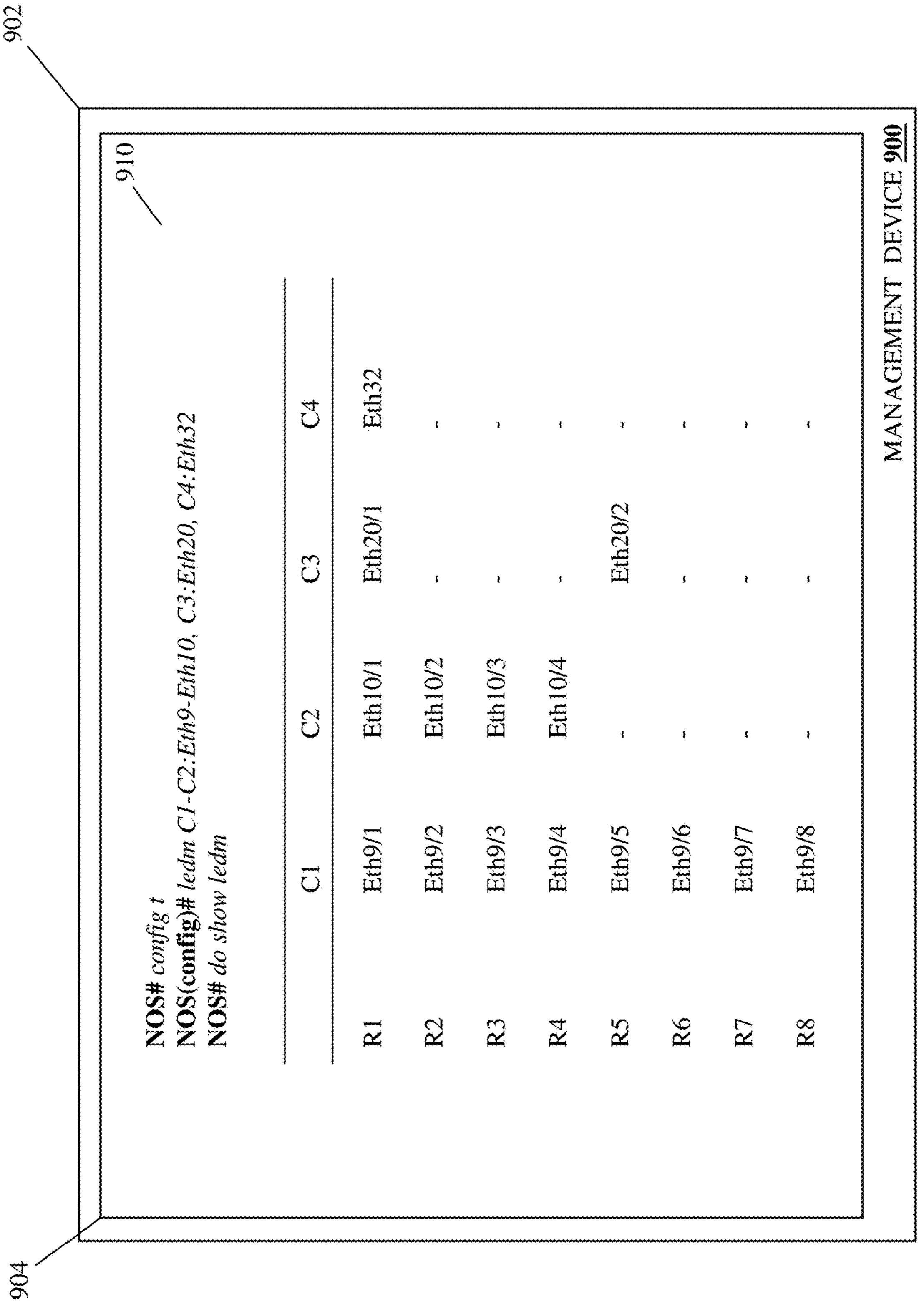
FIG. 9C is a screen-shot view illustrating an embodiment of a management device being used to configure the operation of the connectable LED system of FIGS. 3A and 3B.

For example, FIGS. 9A, 9B, and 9C illustrated how a management device 900 may be provided for use in identifying a mapping of the data ports 210 on the communication system 208 in the networking device 200 to the LEDs included on the connectable LED system 300, as well as for use in changing that mapping. In an embodiment, the management device 900 may be provided by the IHS 100 discussed above with reference to FIG. 1, may include some or all of the components of the IHS 100, and in specific examples, may be provided by a laptop/notebook computing device (e.g., that may be connected directly via the management cabling system 600 to a console port provided by one of the management ports 212), a desktop computing device (e.g., that may be connected via a network and the management cabling system 600 to an OOB Ethernet port provided by one of the management ports 212), and/or any other computing devices that would be apparent to one of skill in the art in possession of the present disclosure. In the illustrated embodiment, the management device 900 includes a chassis 902 housing (or coupled to) a display device 904 that one of skill in the art in possession of the present disclosure will appreciate is illustrated and described below as displaying Command Line Interface (CLI) screens with commands and responses related to the mapping of the data ports 210 and the LEDs on the connectable LED system 300.

For example, FIG. 9A illustrates a CLI screen 906 displaying a "default" data port 210/LED mapping that one of skill in the art in possession of the present disclosure will appreciate may provide a specific example of a default data port 210/LED mapping for a 32-data-port switch device. For example, in response to a CLI command (e.g., "NOS #show ledm", with "ledm" referring to the connectable LED system 300), a CLI response may be provided that identifies each data port 210 (referred to as "Eth1", "Eth2", and up to "Eth32" for each of the 32 data ports on the switch device) and the row/column combination of the LED on the connectable LED system 300 to which that data port 210 is mapped. As will be recognized by one of skill in the art in possession of the present disclosure, the default data port 210/LED mapping for the 32-data-port switch device illustrated in FIG. 9A maps a respective one of the LEDs to a respective one of the data ports 210 in sequence, with the "first" data port 210 ("Eth1") mapped to the "first" LED (the LED at "R1"/"C1"), the "second" data port 210 ("Eth2") mapped to the "second" LED (the LED at "R1"/"C2"), and up to the "last" data port 210 ("Eth32") mapped to the "last" LED (the LED at "R8"/"C4"). However, while a specific "default" data port 210/LED mapping has been illustrated and described, one of skill in the art in possession of the present disclosure will appreciate how other "default" data port 210/LED mappings will fall within the scope of the present disclosure as well.

In another example, FIG. 9B illustrates a CLI screen 908 displaying a "remapped" data port 210/LED mapping that one of skill in the art in possession of the present disclosure will appreciate may provide a modification to the default data port 210/LED mapping described above. For example, some embodiments of the present disclosure may initially utilize the default data port 210/LED mapping when the connectable LED system 300 is used with the networking device 200, and then may remap data ports 210 to the LEDs on the connectable LED system 300 to focus on particular ports (e.g., for the purposes of troubleshooting, debugging, etc.). For example, in response to CLI commands (e.g., "NOS #config t", followed by "NOS (config) #ledm R1-R3: Eth18-Eth20, R4:Null, R5-R6:Eth27, R7:Eth49, R8:Eth64", followed by "NOS #do show ledm"), a CLI response may be provided that identifies the remapping of a subset of the data ports 210 on the communication system 208 in the networking device 200 to the LEDs on the connectable LED system 300.

As will be recognized by one of skill in the art in possession of the present disclosure, the portion of the CLI command "R1-R3: Eth18-Eth20" uses a range command "-" to map the "eighteenth", "nineteenth" and "twentieth" data port 210 ("Eth18", "Eth19", and "Eth20") to the rows 1, 2, and 3 of LEDs ("R1", "R2", and "R3") on the connectable LED system 300. In some embodiments, the networking engine 204 in the networking device 200 may be configured to determine a number of LEDs that are required to map to any particular port (e.g., more than one LED may be required to be mapped to a port configured in a "breakout" mode to provide multiple connections), and may execute the CLI commands accordingly. As such, in the specific example illustrated in FIG. 9B, the "eighteenth" data port 210 ("Eth18") may not be configured in a "breakout" mode and thus may be mapped to the LED at "R1"/"C1". Similarly, the "nineteenth" data port 210 ("Eth19") may be configured in a "breakout" mode with four connections and thus may have a first of those connections ("Eth19/1") mapped to the LED at "R2"/"C1", a second of those connections ("Eth19/2") mapped to the LED at "R2"/"C2", a third of those connections ("Eth19/3") mapped to the LED at "R2"/"C3", and a fourth of those connections ("Eth19/4") mapped to the LED at "R2"/"C4". Similarly, the "twentieth" data port 210 ("Eth20") may be configured in a "breakout" mode with two connections and thus may have a first of those connections ("Eth20/1") mapped to the LED at "R3"/"C1", and a second of those connections ("Eth20/2") mapped to the LED at "R3"/"C3".

Furthermore, in the event a user attempts to remap a port configured in a breakout mode to a number of LEDs that is not sufficient to map a respective LED to each connection provided by that port, the networking engine 204 in the networking device 200 may be configured to map as many of those connections to LEDs as is possible, and then provide a warning to the user. For example, in the event a "twenty-seventh" data port 27 (e.g., "Eth27") configured in a breakout mode with 8 connections is mapped to row 5 ("R5") including four LEDs, the networking engine 204 may map the first four connections provided by that data port 210 to the four respective LEDs in row 5, and may display a warning to the user such as "Warning: Eth27 includes 8 breakout connections and should be remapped to 8 LEDs. Currently remapping only the first four breakout connections for Eth27 to R5."

As will also be recognized by one of skill in the art in possession of the present disclosure, the portion of the CLI command "R4:Null" may prevent row 4 of the LEDs on the connectable LED system 300 from being mapped to any of the data ports 210 on the communication system 208 in the networking device 200. One of skill in the art in possession of the present disclosure will appreciate how such a "null" command may be used to ensure a row of the LEDs on the connectable LED system 300 are not used, as the connectable LED system 300 may be configured to use any earlier saved mapping of port(s) to that row in the event that row in not specified in the CLI command.

As will also be recognized by one of skill in the art in possession of the present disclosure, the portion of the CLI command "R5-R6:Eth27" uses a range command "-" to map the "twenty-seventh" data port 210 ("Eth27") to the rows 5 and 6 of LEDs ("R5" and "R6") on the connectable LED system 300. As such, in the specific example illustrated in FIG. 9B, the "twenty-seventh" data port 210 ("Eth27") may be configured in a "breakout" mode with eight connections and thus may have a first of those connections ("Eth27/1") mapped to the LED at "R5"/"C1", a second of those connections ("Eth27/2") mapped to the LED at "R5"/"C2", a third of those connections ("Eth27/3") mapped to the LED at "R5"/"C3", a fourth of those connections ("Eth27/4") mapped to the LED at "R5"/"C4", a fifth of those connections ("Eth27/5") mapped to the LED at "R6"/"C1", a sixth of those connections ("Eth27/6") mapped to the LED at "R6"/"C2", a seventh of those connections ("Eth27/7") mapped to the LED at "R6"/"C3", and an eighth of those connections ("Eth27/8") mapped to the LED at "R6"/"C4".

As will also be recognized by one of skill in the art in possession of the present disclosure, the portion of the CLI command "R7:Eth49" maps the "forty-ninth" data port 210 ("Eth49") to the row 7 of LEDs ("R7") on the connectable LED system 300. As will also be recognized by one of skill in the art in possession of the present disclosure, the portion of the CLI command "R8:Eth64" maps the "sixty-fourth" data port 210—("Eth64") to the row 8 of LEDs ("R8") on the connectable LED system 300. As such, in the specific example illustrated in FIG. 9B, the "sixty-forth" data port 210 ("Eth64") may be configured in a "breakout" mode with four connections and thus may have a first of those connections ("Eth64/1") mapped to the LED at "R8"/"C1", a second of those connections ("Eth64/2") mapped to the LED at "R8"/"C2", a third of those connections ("Eth64/3") mapped to the LED at "R8"/"C3", and a fourth of those connections ("Eth64/4") mapped to the LED at "R8"/"C4".

In another example, FIG. 9C illustrates a CLI screen 910 displaying a "remapped" data port 210/LED mapping that one of skill in the art in possession of the present disclosure will appreciate may provide a modification to the default data port 210/LED mapping described above, and utilizes "column-based" mapping (rather than the "row-based" mapping illustrated and described above) that may be particularly useful in situations in which ports are configured in a breakout mode with eight connections. For example, in response to CLI commands (e.g., "NOS #config t", followed by "NOS (config) #ledm C1-C2:Eth9-Eth10, C3:Eth20, C4:Eth32", followed by "NOS #do show ledm"), a CLI response may be provided that identifies the remapping of a subset of the data ports 210 on the communication system 208 in the networking device 200 to the LEDs on the connectable LED system 300.

Similarly as described above, the portion of the CLI command "C1-C2:Eth9-Eth10" uses a range command "-" to map the "ninth" and "tenth" data port 210 ("Eth9" and "Eth10") to the columns 1 and 2 of LEDs ("C1" and "C2") on the connectable LED system 300. Similarly as discussed above, the networking engine 204 in the networking device 200 may be configured to determine a number of LEDs that are required to map to any particular port (e.g., more than one LED may be required to be mapped to a port configured in a "breakout" mode to provide multiple connections), and may execute the CLI commands accordingly. As such, in the specific example illustrated in FIG. 9C, the "ninth" data port 210 ("Eth9") may be configured in a "breakout" mode with eight connections, with a first of those connections ("Eth9/1") mapped to the LED at "C1"/"R1", a second of those connections ("Eth9/2") mapped to the LED at "C1"/"R2", a third of those connections ("Eth9/3") mapped to the LED at "C1"/"R3", a fourth of those connections ("Eth9/4") mapped to the LED at "C1"/"R4", a fifth of those connections ("Eth9/5") mapped to the LED at "C1"/"R5", a sixth of those connections ("Eth9/6") mapped to the LED at "C1"/"R6", a seventh of those connections ("Eth9/7") mapped to the LED at "C1"/"R7", and an eighth of those connections ("Eth9/8") mapped to the LED at "C1"/"R8". Similarly, in the specific example illustrated in FIG. 9C, the "tenth" data port 210 ("Eth10") may be configured in a "breakout" mode with four connections, with a first of those connections ("Eth10/1") mapped to the LED at "C2"/"R1", a second of those connections ("Eth 10/2") mapped to the LED at "C2"/"R2", a third of those connections ("Eth 10/3") mapped to the LED at "C2"/"R3", a fourth of those connections ("Eth 10/4") mapped to the LED at "C2"/"R4".

As will also be recognized by one of skill in the art in possession of the present disclosure, the portion of the CLI command "C3:Eth20" maps the "twentieth" data port 210 ("Eth20") to the column 3 of LEDs ("C3") on the connectable LED system 300. As such, in the specific example illustrated in FIG. 9C, the "twentieth" data port 210 ("Eth20") may be configured in a "breakout" mode with two connections and thus may have a first of those connections ("Eth20/1") mapped to the LED at "C3"/"R1", and a second of those connections ("Eth20/2") mapped to the LED at "C3"/"R5". As will also be recognized by one of skill in the art in possession of the present disclosure, the portion of the CLI command "C4:Eth32" maps the "thirty-second" data port 210 ("Eth32") to the column 4 of LEDs ("C4") on the connectable LED system 300.

As will be appreciated by one of skill in the art in possession of the present disclosure, the specific embodiments illustrated and described above may be modified to provide the networking device connectable LED system in a variety of scenarios. For example, in datacenters or other networked systems using liquid cooling, the connectable LED system of the present disclosure may be connected to a networking device being liquid cooled via a USB cable that extends into the liquid cooling medium, thus allowing the connectable LED system to be located outside of the liquid cooling medium while performing the functionality described above. Similarly, a USB cable may be used to connect the connectable LED system of the present disclosure to networking devices with USB ports on its back panel or other outer surface, and/or to networking devices with ports that are not easily viewable, allowing the connectable LED system to be positioned in a location that is relatively easily viewable by a user.

Thus, systems and methods have been described that provide a connectable LED system that includes a plurality of LEDs and that is configured to connect to a first port on a networking device, receive LED control information from the networking device, and use that LED control information to illuminate any of the plurality of LEDs that are mapped to second ports or other subsystems in the networking device in order to display information associated with those second ports or subsystems. For example, the networking device connectable LED system of the present disclosure may include a connectable LED system chassis, a networking device connector on the connectable LED system chassis, LEDs on the connectable LED system chassis, and an LED control subsystem in the connectable LED system chassis that is coupled to the networking device connector and the LEDs. The LED control subsystem receives, via the networking device connector when it is connected to a networking device via a first port of a plurality of ports that are included on the networking device, second port LED control information that is associated with the operation of a second port that is included in the plurality of ports. The LED control subsystem then identifies a second port LED that is included in the LEDs and that is mapped to the second port, and causes the second port LED to illuminate based on the second port LED control information.

As will be appreciated by one of skill in the art in possession of the present disclosure, the systems and methods of the present disclosure allow for the LED system hardware-specific components to be moved from the networking device to the connectable LED system that may then be connected to and used with networking devices when needed, with the networking device only requiring software configured to generate the LED control information described herein. As such, LEDs subsystems may be removed from networking devices, which for a 32 port 1 Rack Unit (1RU) height switch device can include up to (4×32=) 128 switchport LEDs, corresponding light pipes (e.g., which are typically integrated on transceiver cages in the networking device), CPLDs, FPGAs, and/or other LED subsystems that would be apparent to one of skill in the art in possession of the present disclosure, with corresponding benefits in power consumption, heat generation/cooling, and aesthetics (e.g., due to the "de-cluttering" of the front panel of the switch device). Furthermore, the design of the connectable LED system may evolve orthogonally to the design of networking devices, thus reducing engineering and testing efforts due to the "software-defined" nature of the connectable LED system from the perspective of the networking device. Further still, and as discussed above, the connectable LED system is configured to support LED-based indications of relatively large numbers of breakout connections from a single port (e.g., 8 breakout connections, 16 breakout connections, etc.).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device connectable Light Emitting Device (LED) system, comprising:

a connectable Light Emitting Device (LED) system chassis;

a networking device connector that is included on the chassis;

a plurality of LEDs that are included on the connectable LED system chassis; and an LED control subsystem that is included in the connectable LED system chassis, that is coupled to the networking device connector and the plurality of LEDs, and that is configured to:

receive, via the networking device connector when the networking device connector is connected to a networking device via a first port of a plurality of ports that are included on the networking device, second port LED control information that is associated with the operation of a second port that is included in the plurality of ports;

identify a second port LED that is included in the plurality of LEDs and that is mapped to the second port; and cause the second port LED to illuminate based on the second port LED control information.

2. The system of claim 1, wherein the LED control subsystem is configured to:

receive, via the networking device connector when the networking device connector is connected to the networking device via the first port of the plurality of ports that are included on the networking device, first subsystem LED control information that is associated with a first subsystem that is included in the networking device;

identify a first subsystem LED that is included in the plurality of LEDs and that is mapped to the first subsystem; and cause the first subsystem LED to illuminate based on the first subsystem LED control information.

3. The system of claim 1, wherein the networking device connector is a Universal Serial Bus (USB) connector and the first port is a USB port.

4. The system of claim 1, wherein the second port LED control information includes a first timestamp, and wherein the LED control subsystem is configured to:

determine that the first timestamp indicates that the second port LED control information is less than a threshold age and, in response, cause the second port LED to illuminate based on the second port LED control information;

receive, via the networking device connector when the networking device connector is connected to the networking device via the first port of the plurality of ports that are included on the networking device, third port LED control information that is associated with the operation of a third port that is included in the plurality of ports and that includes a second timestamp; and determine that the second timestamp indicates that the third port LED control information is more than the threshold age and, in response, drop the third port LED control information.

5. The system of claim 1, further comprising:

an LED sub-chassis that is included on the connectable LED system chassis, wherein each of the plurality of LEDs are visible on the LED sub-chassis, and wherein the LED sub-chassis includes a maximum height of 1 Rack Unit (1RU).

6. The system of claim 1, wherein the second port LED control information identifies the second port LED that is mapped to the second port, and wherein the LED control subsystem is configured to identify the second port LED via the second port LED control information.

7. An Information Handling System (IHS), comprising:

a networking device chassis;

a plurality of ports included on the networking device chassis;

a networking processing system that is included in the networking device chassis and that is coupled to the plurality of ports;

a networking memory system that is coupled to the networking processing system and that includes instructions that, when executed by the networking processing system, cause the networking processing system to provide a networking engine;

a connectable Light Emitting Device (LED) system that includes a networking device connector that is connected to a first port included in the plurality of port;

a plurality of LEDs that are included on the connectable LED system; and an LED control subsystem that is included in the connectable LED system, that is coupled to the networking device connector and the plurality of LEDs, and that is configured to:

receive, from the networking engine via the networking device connector, second port LED control information that is associated with the operation of a second port that is included in the plurality of ports;

identify a second port LED that is included in the plurality of LEDs and that is mapped to the second port; and cause the second port LED to illuminate based on the second port LED control information.

8. The IHS of claim 7, wherein the LED control subsystem is configured to:

receive, from the networking engine via the networking device connector, first subsystem LED control information that is associated with a first subsystem that is included in the networking device;

identify a first subsystem LED that is included in the plurality of LEDs and that is mapped to the first subsystem; and cause the first subsystem LED to illuminate based on the first subsystem LED control information.

9. The IHS of claim 7, wherein the networking device connector is a Universal Serial Bus (USB) connector and the first port is a USB port.

10. The IHS of claim 7, wherein the second port LED control information includes a first timestamp, and wherein the LED control subsystem is configured to:

determine that the first timestamp indicates that the second port LED control information is less than a threshold age and, in response, cause the second port LED to illuminate based on the second port LED control information;

receive, from the networking engine via the networking device connector, third port LED control information that is associated with the operation of a third port that is included in the plurality of ports and that includes a second timestamp; and determine that the second timestamp indicates that the third port LED control information is more than the threshold age and, in response, drop the third port LED control information.

11. The IHS of claim 7, further comprising:

an LED sub-chassis that is included on the connectable LED system, wherein each of the plurality of LEDs are visible on the LED sub-chassis, and wherein the LED sub-chassis includes a maximum height of 1 Rack Unit (1RU).

12. The IHS of claim 7, wherein the second port LED control information identifies the second port LED that is mapped to the second port, and wherein the LED control subsystem is configured to identify the second port LED via the second port LED control information.

13. The IHS of claim 7, wherein the second port LED control information is associated with the operation of a third port that is included in the plurality of ports, and wherein the LED control engine is configured to:

identify a third port LED that is included in the plurality of LEDs and that mapped to the third port; and cause the third port LED to illuminate based on the second port LED control information.

14. A method for displaying information about ports on a networking device using a connectable Light Emitting Device (LED) system, comprising:

connecting, by a connectable Light Emitting Device (LED) system via a networking device connector on the connectable LED system, to a networking device via a first port of a plurality of ports that are included on the networking device;

receiving, from the networking device via the networking device connector by an LED control subsystem that is included in the connectable LED system and coupled to the networking device connector, second port LED control information that is associated with the operation of a second port that is included in the plurality of ports;

identifying, by the LED control subsystem, a second port LED that is included in the plurality of LEDs and that is mapped to the second port; and causing, by the LED control subsystem, the second port LED to illuminate based on the second port LED control information.

15. The method of claim 14, further comprising:

receiving, from the networking device via the networking device connector by the LED control subsystem, first subsystem LED control information that is associated with a first subsystem that is included in the networking device;

identifying, by the LED control subsystem, a first subsystem LED that is included in the plurality of LEDs and that is mapped to the first subsystem; and causing, by the LED control subsystem, the first subsystem LED to illuminate based on the first subsystem LED control information.

16. The method of claim 14, wherein the networking device connector is a Universal Serial Bus (USB) connector and the first port is a USB port.

17. The method of claim 14, wherein the second port LED control information includes a first timestamp, and wherein the method further comprises:

determining, by the LED control subsystem, that the first timestamp indicates that the second port LED control information is less than a threshold age and, in response, causing the second port LED to illuminate based on the second port LED control information;

receiving, from the networking device via the networking device connector by the LED control subsystem, third port LED control information that is associated with the operation of a third port that is included in the plurality of ports and that includes a second timestamp; and determining, by the LED control subsystem, that the second timestamp indicates that the third port LED control information is more than the threshold age and, in response, dropping the third port LED control information.

18. The method of claim 14, wherein the connectable LED system includes an LED sub-chassis, wherein each of the plurality of LEDs are visible on the LED sub-chassis, and wherein the LED sub-chassis includes a maximum height of 1 Rack Unit (1RU).

19. The method of claim 14, wherein the second port LED control information identifies the second port LED that is mapped to the second port, and wherein the LED control subsystem identifies the second port LED via the second port LED control information.

20. The method of claim 14, wherein the second port LED control information is associated with the operation of a third port that is included in the plurality of ports, and wherein the method further comprises:

identifying, by the LED control subsystem, a third port LED that is included in the plurality of LEDs and that mapped to the third port; and causing, by the LED control subsystem, the third port LED to illuminate based on the second port LED control information.

* * * * *